TOLL TICKETING TELEPHONE SYSTEM

Filed Aug. 28, 1959 16 Sheets-Sheet 1

INVENTORS.
WILLIAM H. BERCH
MILTON A. CLEMENT
ROBERT K. KAYE
JOHN W. NEWITT

BY [signature]

ATTORNEY

TOLL TICKETING TELEPHONE SYSTEM

Filed Aug. 28, 1959 16 Sheets-Sheet 4

Aug. 27, 1963 W. H. BERCH ET AL 3,102,166

TOLL TICKETING TELEPHONE SYSTEM

Filed Aug. 28, 1959 16 Sheets-Sheet 8

Aug. 27, 1963 W. H. BERCH ET AL 3,102,166

TOLL TICKETING TELEPHONE SYSTEM

Filed Aug. 28, 1959 16 Sheets-Sheet 11

Aug. 27, 1963 W. H. BERCH ET AL 3,102,166

TOLL TICKETING TELEPHONE SYSTEM

Filed Aug. 28, 1959 16 Sheets-Sheet 13

Aug. 27, 1963 W. H. BERCH ET AL 3,102,166

TOLL TICKETING TELEPHONE SYSTEM

Filed Aug. 28, 1959 16 Sheets-Sheet 14

United States Patent Office 3,102,166

Patented Aug. 27, 1963

3,102,166

TOLL TICKETING TELEPHONE SYSTEM

William H. Berch, Penfield, and Milton A. Clement, Rochester, N.Y., Robert K. Kaye, Medford Lakes, N.J., and John William Newitt, Rochester, N.Y., assignors to General Dynamics Corporation, Rochester, N.Y., a corporation of Delaware Filed Aug. 28, 1959, Ser. No. 836,752
33 Claims. (Cl. 179—7.1)

This invention relates to a telephone system and more particularly to a telephone system including means for automatically ticketing toll calls.

In order to provide completely automatic facilities for producing permanent records of toll calls, it is necessary to have available various items of information including: called number, called area, calling number, and the date and time of call. From the foregoing data an applicable rate between the two stations may be determined and combined with the elapsed time to compute the total charge to be made for the call.

A system for the registration of the required information and the ultimate printing of a toll ticket of uniform format is disclosed and described in the Morris and Clement Patent No. 2,877,311. In addition, the copending application of Carl G. Shook, Serial No. 693,089, filed October 29, 1957, now Patent No. 3,007,004 entitled "An Electronic Rate Marker," and which is assigned to the same assignee as the present invention, discloses a means for translating appropriate information into a rate signal to be provided to a computer.

The cited patent discloses a means of recording the pertinent information on a magnetic tape and of recovering the information from the tape to produce a toll ticket. As shown in the cited patent, the magnetic tape uses two recording channels, one referred to as the mark channel, is used for recording digital information while the other, referred to as the space channel, is used for magnetically recording the space between each series, or chain, of marks. Intelligible and useful information can only be recovered from the tape if the correct correspondence between digital sequence and significance can be determined. The means for achieving this in the cited patent is to use a uniform and constant number of digits for each piece of information. This requires, for example, that the first seven digits of information must always comprise the called number, the next series of marks must always indicate the month, etc. Naturally, any suitable sequence of recording may be used as long as the same sequence is inflexibly maintained thereby preserving the positional, or sequential, significance of the digits represented by the pulses recorded as marks. Thus the system disclosed in the cited patent is limited, in that called numbers of a variable number of digits cannot be accommodated.

The present invention is directed to a toll ticketing telephone system in which the called number may consist of a variable number of digits. Consequently, the recorded digit's sequential position is not indicative of the digit's significance. Therefore, the readout equipment, which recovers the recorded information from the magnetic tape, must be furnished information in addition to that normally placed on the tape in order to ascertain the significance of a recorded digit from the digit's sequential positioning. That is, the readout equipment must be informed when the sixth group of pulses on the tape is to be interpreted as the sixth digit of a seven-digit called number and when it should be interpreted as the month indication following a five-digit called number.

The use of uniform numbering wherein called numbers consist of a total of seven digits, usually expressed as the two-letter, five-digit numbering system, obviates much confusion as most called numbers thus comprise seven digits. However, with the advent of nationwide subscriber toll dialing with the attendant requirement for a three-digit area prefix to be dialed prior to the dialing of the called number when the called number is outside the area of the calling number, it is apparent that even with two-letter, five-digit numbering that some called numbers will consist of seven digits while others will comprise a total of ten digits.

The cited copending application of Carl G. Shook, Serial No. 693,089, filed October 29, 1957 discloses a means of translating area code, called office code and calling office code information into a rate signal to a computer. The Shook system presupposes that each of these items will be recorded in a predetermined sequence in a predetermined group of registers which may be sequentially interrogated to determine the applicable rate to be furnished to a computer. Thus in the Shook system, if one of the required items was not available or if they were recorded in variable registers, the proper rate could not be determined.

The present invention is directed to a rate marker which is capable of testing for the presence or absence of an area code and in accordance with the results of said testing for interrogating the proper registers in obtaining rate determining data.

Accordingly, one object of the present invention is to provide a new and improved automatic toll ticketing system.

Another object is to provide a toll ticketing system including new and improved means for providing an intelligible record of a toll call.

Another object is to provide an automatic toll ticketing system which is operable with called numbers having a variable number of digits.

Another object is to provide an automatic toll ticketing system having means to restore digital significance to recorded digits even though the digital position may vary.

Another object is to provide a toll ticketing system having a new and improved rate translator for providing rate information to a computer.

Another object is to provide a rate translator for a toll ticketing system and operable with or without called area code information.

Another object is to provide a rate translator for an automatic toll ticketing system operable to furnish a unique rate signal irrespective of the fact that certain rate determining digits may be recorded in variable ones of a plurality of registers depending upon the nature of the variable digit called number.

Another object is to provide permanent records of toll calls having a uniform format irrespective of the fact that the called number may have a variable number of digits.

Other objects and advantages of the present invention will become apparent from the ensuing description of an illustrative embodiment thereof, and features of novelty which characterize the invention will be pointed out in particularity in the claims annexed to and forming a part of this specification.

For a complete understanding of this invention, reference may be had to the accompanying drawings which comprise twenty figures on sixteen sheets. The sixteen sheets of drawings should be arranged as shown in FIG. 20 to show the invention.

FIGS. 1, 2 and 3 are a block diagram of an automatic toll ticketing system embodying the present invention which is shown in conjunction with a conventional automatic telephone system, FIGS. 4, 5 and 6 show the circuit details of the steering circuit and the steering write-in control circuit, FIGS. 7 and 8 show the circuit details of a typical register circuit, FIGS. 9, 10, 11 and 12 show the circuit details of the steering readout circuit, FIGS. 13 to 19, inclusive, show circuit details of the various elements of the rate translator, and FIG. 20 is a block diagram disclosing the manner in which FIGS. 1–12 are positioned to form a complete circuit diagram of an automatic toll ticketing system forming an embodiment of the present invention.

Referring now more specifically to FIGS. 1, 2 and 3 of the drawings, therein is disclosed, in block diagram form, the improved electronic readout and register equipment which is illustrated in conjunction with certain components of an automatic telephone system of the type described and disclosed in detail in the referenced Morris and Clement patent. In general, this automatic toll ticketing system includes a plurality of trunk recorders, such as trunk recorder 10, each of which is individual to a trunk circuit 11 through which toll calls are extended. The trunk recorder 10 is preferably of the type disclosed in the Gleason Patent No. 2,867,435. As disclosed therein, the trunk recorder 10 includes an endless loop of magnetic tape adjacent to which two transversely spaced transducing heads are disposed to provide two effective channels on the magnetic tape. One of these channels is adapted to receive intelligence, or mark, pulses and the other of these channels is adapted to receive control, or space, pulses; the space signals being interposed between consecutive groups of mark pulses to define the effective ends thereof. The trunk recorder includes a step-by-step drive mechanism for advancing the magnetic tape intermittently during a recording operation and a selectively controlled continuous drive mechanism for advancing the endless loop of magnetic tape continuously during reproducing or retransmitting operations.

When the trunk circuit 11 to which the recorder 10 is connected is seized during the extension of a toll call, circuits are prepared therein for repeating the dialed digits to the recorder 10 and for supplying a space pulse following each of the dialed digits. These circuits repeat the impulses of the dialed digits directly to the mark pulse transducing head so that spaced groups of mark pulses, each containing a number of pulses equal to the value of a dialed digit, are recorded on the tape. The control circuits automatically energize the space pulse transducing head to record a space signal on the magnetic tape immediately following each of the groups of mark pulses. In this manner, all of the digits dialed in extending a toll connection are recorded on the magnetic tape.

The digits dialed by the calling subscriber represent the directory number of the called subscriber. Depending upon the numbering plan of the terminating office, the called number may consist of a variable number of digits, usually varying between four and eight, with most called numbers having seven digits. In addition, if the system is adapted for use in nationwide toll dialing, an area code may be dialed prior to the dialing of the terminating subscriber's directory number. Consequently, it is evident that the recorded information may be composed of a variable number of digits and that special provisions must be made to indicate the separation between the dialed information and other digital information which is pulsed onto the magnetic tape to provide further information relative to the dialed call.

One means of providing the required separation of information is to provide a digit counting means in each trunk circuit and cause it to place dummy digits on the tape in each unused position. That is, called numbers using less than the maximum number of digits could be artificially built up to the maximum number of digits. While such a device would provide a workable solution, it is neither convenient nor economical as such a device would be required in each trunk and would require unnecessary use of the magnetic tape. Consequently, the present invention contemplates the use of a double space indication on the magnetic tape at the conclusion of the dialed information and prior to the placing of other digital information on the tape.

Following the storage of the called number in the trunk recorder 10, the trunk or adapter circuit with which the trunk recorder 10 is associated waits for an answer supervision signal from the terminating office. In response to the answer supervision signal, which may be in any suitable form, a space is placed on the tape immediately following the space which was placed on the tape at the conclusion of the last dialed digit. In further response to the answer supervision, other pertinent information such as date and time, calling number, etc., are pulsed onto the tape. Elapsed time pulses are periodically put on the tape during the time the connection is held.

At the termination of the call and following the recording of all of the necessary items of information in the trunk recorder 10, the connection is released and the adapter or trunk circuit operates to record an end-of-call signal on the tape signifying the completion of the recording of all of the items of information pertaining to the call.

The readout equipment accepts all information prior to two consecutive spaces as called number information and in response to the indication of the two consecutive spaces, the remaining digital pulses are accorded their proper significance in accordance with their sequential position from the two consecutive spaces. When the data stored in the trunk recorder 10 is to be recorded in permanent form, a readout control circuit 12 places a switch means **12*a* associated therewith in operation to search for and seize one of a plurality of idle playback control circuits, such as playback control circuit 14, to which the switching means 12*a* has access. Upon the seizure of the playback control circuit 14, this circuit operates a switching means 14*a* associated therewith to search for and seize an idle trunk recorder, such as the recorder 10. Incident to placing the circuits 12 and 14 in operation, the recording and registering facilities associated with the readout control circuit 12 are cleared and placed in a normal condition in which they are capable of receiving, storing, and recording the items of information stored in the trunk recorder 10. Following the completion of this resetting or clearing operation, the playback control circuti 14 renders the continuous drive mechanism in the trunk recorder 10 effective so that the endless loop of magnetic tape is advanced to transmit a series of mark pulses through the playback control circuit 14 to a mark pulse amplifier 16 and to transmit the space pulses separating the various groups of mark pulses through the playback control circuit 14 to a space pulse amplifier 18. The mark pulse amplifier 16 amplifies and shapes the successive groups of mark pulses received from the trunk recorder 10 and applies these groups of pulses to an output conductor 16*a* which is connected in common to the input of a plurality of counting type register chains 21 to 43. Eleven of the digit register circuits are used during readout to register the called, or dialed, digits. Registers 21, 22 and 23** may be used to register an area code, when dialed, or they may register the first three digits of the called number which with a two-letter, five-digit number represent the called office code A, B and C digits. Registers 24–31 may be used for recording the remaining digits of the called number including the called office code A, B and C digits when an area code has been dialed. As will be shown, registers within the group 21–31 which are not required for registering the called subscriber number designation are left blank or vacant.

In order to render the registers 21–31 effective in sequence to register only a single one of the groups of mark pulses appearing on the common mark pulse conductor 16a, a steering circuit 50 is provided having a plurality of switching stages. When the first group of mark pulses appear on the common mark pulse conductor 16a, the first switching stage of steering circuit 50 is in a conductive condition to provide an enabling bias for the input of the register 21 and accordingly the value of the first digit is stored in register 21. Thereafter the successive space pulses applied to the space pulse amplifier 18 from the trunk recorder 10, which pulses are interspersed between adjacent groups of mark pulses, are amplified thereby and applied to a common space conductor 18a. The first pulse appearing on the conductor 18a disables the first switching stage of steering circuit 50 and operates the second switching stage so that the second group of mark pulses is effective to operate the second digit register 22 thereby to store the value of this digit therein. In a similar manner, the remaining switching stages of the steering circuit 50 may be operated in sequence to successively enable the remaining registers, whereby each register receives one group of mark pulses.

The steering write-in control circuit 70 permits the successive enabling of the first eleven switching stages of steering circuit 50 in their turn as long as space pulses are received on space conductor 18a interspersed between each group of mark pulses on conductor 16a. In response to two consecutive space pulses on conductor 18a without any intervening mark pulses on conductor 16a, the steering write-in control circuit 70 will place an enabling potential on enabling lead 70a thereby enabling stage 12 of steering circuit 50. The enabling of stage 12 causes the previously enabled stage, which may be any stage 4–11, to be disabled. Thus, the two consecutive space pulses with no intervening mark pulses causes the steering write-in control circuit 70 to enable a specific or predetermined one of the stages in steering circuit 50. As a consequence, only those registers from the group 21–31 which are required for the storage of the dialed digits are used. Furthermore, the next bit of information which, in the illustrated embodiment, represents the calling office code is registered in the calling office code register circuit 32 rather than in the next succeeding idle register. Consequently, the two consecutive spaces are effective to restore significance to the groups of mark pulses by indicating the end of the variable length called number and the start of other digital information wherein a strict correspondence is maintained between digital sequence and significance.

The remaining digital information on the magnetic tape in the form of groups of mark pulses separated by space pulses is transferred to the remaining registers 33–43 under the control of steering circuit 50.

READOUT AND PRINTING

Referring still to FIGS. 1, 2 and 3, the principles of readout and the printing of the toll ticket may be described. The information stored in the registers 21–43 may be read out and transferred to punched tape, a typed ticket or any convenient form of data processing equipment. For convenience and simplicity of description, it will be assumed that an electrically controlled device, such as a typewriter, is used to print the toll tickets. The typewriter or printer 80 is arranged to print character-by-character and after printing each character or performing other functions, such as spacing or carriage returns, it places a pulse on printing pulse conductor PP to signal the steering readout circuit 86 that the printer 80 is ready to accept another character. Because various codes are used by various printing or data processing devices that may be used in conjunction with this equipment, a translator 82 is used between the registers 21–43 and the printer 80. The function of the translator 82 is to translate or convert the signals received to the necessary code that will cause the printer 80 or other data processing equipment to print the desired character.

In preparing a toll ticket of uniform and convenient format, it is necessary to insert fixed characters, spaces and carriage returns at suitable points. These are inserted by the fixed character printing circuit 84 which is in essence a simple register capable of registering only fixed or constant information. During the reading and printing process, the steering and readout circuit 86 will interrogate the necessary registers 21–43 and the fixed character registers within the fixed character printing circuit 84 in a predetermined sequence to produce a toll ticket of convenient format. Naturally, all toll tickets should have a uniform format irrespective of the fact that an area code may or may not have been dialed in conjunction with the dialing of the called subscriber's telephone number. That is, a line on the toll ticket should be reserved for the printing of an area code when required. Thus, an area code detector circuit 74 is employed to determine the presence or absence of an area code. It will be recalled, by those skilled in the art, that the numbering plan used in the nationwide toll dialing system is one which permits no conflict between area codes and office codes. The office codes are made up of two letters and a digit and, since no letters are found with either the digits 1 or 0 on a telephone dial, an office code cannot have a 1 or 0 in either of the first two positions. Therefore, to provide a clear distinction between the two, all area codes are assigned with either a 1 or 0 as the second digit of the three-digit area code. The area code detector circuit 74 may, by examination of register 22, determine the presence or absence of an area code. The presence or absence is passed respectively on the yes area code conductor YAC or the no area code conductor NAC to the steering readout circuit 86. In response to the signal received on either conductor YAC or NAC, the steering readout circuit 86 in cooperation with the fixed character printing circuit 84 will cause the digits registered in the registers 21–23 to be printed in the area code space or the called office code space as may be required.

As an economy in the use of magnetic tape, the office code of the calling number is put on the tape in coded single digit form. However, it is desirable to have the toll ticket prepared indicating the calling office in the usual two-letter and single-digit form. The required translation may be made in the office code translating circuit 78 which interrogates the calling office code register circuit 32 and in turn provides the proper three-digit office code to the translator 82 and printer 80 as the steering readout circuit 86 reads the three-digit translated code from the office code translating circuit 78.

RATE TRANSLATING

In addition to the reading of the registers for the purpose of printing a ticket, the registers are read to determine the rate at which the registered call should be charged. Various items must be considered in determining the rate; for example, the terminating area, the terminating office code, the calling office code as well as the date and time of day. Signals representing these items may be combined in various combinations to obtain a single rate signal. The resulting rate signal is directed to a computer which combines this signal with the signal representing the call holding period to determine the total charge to be made for the particular call. While the techniques are not shown in these drawings, as they do not form any part of this invention, the computed charge is printed on the toll ticket produced by the printer.

Referring still to FIGS. 1, 2 and 3, the principles of rate translating may be illustrated. As previously described, registers 21, 22 and 23 may have registered therein either area code or called office code information. In the former case, register 22 will have recorded therein either a 1 or a 0; while in the latter case, any of the digits 2 to 9 may be recorded in register 22.

*Area code detector.*—When register 22 is enabled by stage 2 of the steering circuit 50, an enabling potential is placed on lead 22*a* thereby enabling tube 74*a* as well as register 22. At the conclusion of the registration of the digit in register 22, a space pulse will be received on lead 18*a* thereby firing tube 74*a*. If any of the plurality of leads represented collectively by lead 74*c* which are connected to the cathodes of tubes 2–9 in register 22 have thereon an enabling potential, as a result of one of the tubes 2–9 being fired, then the firing of tube 74*a* furnishes a pulse through matrix 74*b* to tube 74*d* which thereby fires. The firing of tube 74*d* extinguishes tube 74*e* which had been turned on by a reset pulse on lead 12*b* from the readout control circuit 12 at the start of the readout operation. Obviously, had no potential been present on one of the plurality of conductors represented by lead 74*c*, the no area code tube 74*d* would not have been fired and the yes area code tube 74*e* would have remained fired. Therefore, if no area code is indicated, an enabling potential will be placed on lead NAC while if an area code is indicated, an enabling potential will be placed on lead YAC. The enabling of register 33 also places a potential on conductor 33*a*. The following space pulse on conductor 18*a* passes through matrix 74*k* to either lead 74*m* or 74*n* depending upon whether lead YAC or NAC has the enabling potential. Thus a pulse is placed on lead 74*m* if an area code is registered in registers 21, 22 and 23 while a pulse is placed on lead 74*n* if an office code is registered in registers 21, 22 and 23.

*Called office code matrix.*—The called office code matrix is used to translate the plural digit called office code to a single pulse, or signal, on a unique lead indicative of the specific called office involved. Since the called office code may be registered in either registers 21, 22 and 23 or 24, 25 and 26, depending respectively on the absence or presence of an area code, two called office code matrices 75 and 76 are provided. The former being used when there is no area code while the latter is used when there is an area code. The operation of the two called office code matrices is similar and therefore only one will be described.

Called office code matrices for no area code 75 translates the A, B and C digits of the called office code to a signal on a selected one of a plurality of output conductors represented collectively as 75*a*. The tube which is fired in each of the called office code registers will place an indicating or enabling voltage on an individual lead corresponding to the digit registered therein. Since in a called office code the A and B digits may only be represented by the numerals 2–9 inclusive, only these leads are wired to the called office code matrix. The 1 and 0 leads from the second registers will be wired to the area code matrix as will be explained later. The group of leads from registers 21, 22 and 23 are represented collectively by lines 75*b*, 75*c* and 75*d*. It should be noted that the indicating voltages are present on these leads from the time that the respective digits were registered. That is, the pulse is placed on the lead 74*n* after the indicating voltages are placel on leads 75*b*, 75*c* and 75*d*. Therefore, the pulse on lead 74*n* may be used to fire the selected one of the plurality of tubes indicated collectively as 75*e* which is enabled by the potential on lead 75*d*. In turn, a pulse is passed to matrix 75*f* and is selectively passed therethrough to a selected one of the plurality of conductors, represented collectively by line 75*a*, in accordance with the indicating or enabling voltages on two of the plurality of conductors represented collectively by lines 75*b* and 75*c*.

*Day-night matrix.*—The day-night matrix 77 is used to modify rates as may be required in accordance with the time of day the call was made. For example, a signal on a selected one of the plurality of leads indicated collectively as 77*a* may, after going through matrix 77*c*, come out on a selected first or second one of a plurality of leads indicated collectively as 77*b*. Thus, there are twice as many output leads 77*b* as input leads 77*a*, or each input lead splits into two possible output leads. The particular output lead on which the signal appears is determined conjointly by the input lead and which one of the tubes 77*d* or 77*e* is fired. During a reset operation at the start of the readout program, tube 77*d* is fired by a pulse on reset lead 12*b* from readout control circuit 12. The clock-calendar circuit (not shown) which causes marks to be placed on the tape of the trunk recorder 10 indicates, in the hours tens position, by the number of marks sent to the tape whether the call is to be charged at the day or night rate. This is accomplished, in general, as follows. The hours tens digit can only be 0, 1 or 2. If the hours tens digit is to be 0, 1 or 2 and the call is to be charged at the day rate then 0, 1 or 2 marks are pulsed onto the tape; while if the hours tens digit is to be 0, 1 or 2 and the call is to be charged at the night rate then 3, 4 or 5 marks are pulsed onto the tape. Consequently, three or more marks on the tape in the hours tens position indicates that the call is to be charged at the night rate.

It will be noted that lead 77*g* provides a 60 volt enabling voltage to tube 77*e* thus if, as the hours tens digit is being registered in register 37, the third tube is fired then a pulse is put on lead 77*h* to fire tube 77*e* which in turn places an indicating potential on lead 77*j* to matrix 77*c* thereby indicating that input signals on 77*a* should be translated to night rate signals on 77*b*. Had the tube 77*e* not been fired by a pulse on lead 77*h* then an indicating potential on lead 77*k* to matrix 77*c* indicates that the input signals on 77*a* are to be translated to day rates on 77*b*.

*Called office registers.*—The called office registers 91 and 92 accept pulses on one of the plurality of conductors represented collectively by leads 75*a* and 76*a* respectively and register the receipt thereof. If the pulse enters one of the plurality of tubes represented collectively by 91*b* or 92*b* a rate signal is put on one of the plurality of output conductors represented collectively by lead 91*c* or 92*c* to fire one of the plurality of rate register tubes represented collectively by rate register 93.

If the input pulse to the called office register enters one of the plurality of tubes represented collectively as 91*a* or 92*a*, a marking potential may be placed on one of the plurality of conductors represented collectively by lead 94*a*.

*Area code matrix.*—The area code matrix 95 is similar to the called office code matrices 75 and 76 in that the function of the area code matrix 95 is to translate a plural digit area code to a single signal on a selected one of a plurality of output conductors represented collectively as 95*a*. It should be noted that the cathode conductors from tubes 1 and 10 are the only ones wired from register 22 to the area code matrix 95*e*. Thus, unless there is an enabling voltage on one or the other of these two conductors, indicating an area code, there can be no output signal responsive to an input signal.

The translate pulse is the space pulse next following the placement of the enabling potential on conductor 39*a*. This pulse fires tube 95*b* which sends a pulse to fire the one of the plurality of tubes represented collectively by 95*c* which is enabled by a conducting tube in register 23. The fired 95*c* tube passes a pulse on conductor 95*d* through matrix 95*e* thereby providing an output on a selected one of a plurality of leads represented collectively by 95*a*. The selected conductor is determined in accordance with which of the plurality of leads from registers 21 and 22 to matrix 95*e* have thereon an enabling voltage.

*Area point registers.*—The area point registers 96 are similar to the called office registers 91 and 92 in that they receive an output pulse from a matrix and pass it on For example, if the output pulse on conductor 95a serves to fire tube 96a, a pulse is passed directly to a rate register tube 93; while if tube 96b is fired, a pulse is passed to matrix 77c on conductor 77a for determination of whether a day or night rate is to be furnished to the rate register; and if tube 96c is fired, a pulse is passed to matrix 94 on one of the leads represented by 94b.

*Calling office code matrix.*—As previously explained, the no area code detector tube 74d would have been fired in the event registers 21, 22 and 23 have registered therein called office code information; while the yes area code tube 74e would have been fired if registers 21, 22 and 23 had registered therein area code information. If it is assumed that the registered call is one that does not involve an area code then as previously explained the no area code tube 74d will be conducting and an enabling potential will thereby be placed on conductor 97c which serves to enable tube 97. Register 32 has registered therein information indicative of the calling office, the fired tube in register 32 places an enabling voltage on a selected one of a plurality of conductors represented collectively by lead 32a thereby placing an enabling voltage to calling office code matrix 98. As previously explained, the space pulse following the enabling of register 39 fires tube 95b thereby placing a pulse on conductor 97a which fires tube 97 which, it must be remembered, is enabled only when there is no area code information. The firing of tube 97 places a pulse on conductor 97b to calling office code matrix 98 thereby providing an output pulse on a selected one of a plurality of output conductors represented collectively by lead 98a. If the output pulse on conductors 98a fires tube 98c then a pulse is provided to the day-night matrix circuit. If the pulse on conductor 98a fires tube 98d then a pulse is provided to matrix circuit 94 to be combined with a called office code pulse and translated to an output on conductor 94c. The firing of tube 98b by a pulse on 98a provides a rate pulse directly to rate register 93.

*Summary of rate translator.*—The function of the rate translator is to furnish a single rate signal to the computer on a distinctive lead in accordance with the rate to be charged for a completed call after all the required factors, such as called office, called area, calling office and the originating time of the call, have been considered. The objective is accomplished by the use of a plurality of matrices, each of which can provide a unique output in response to a plural signal input. The signals are routed through a succession of matrices until all the bits of information that are involved have been considered and merged into a unique output signal representative of all the bits of input information.

DETAILED DESCRIPTION—STEERING CIRCUIT

Figure 1:
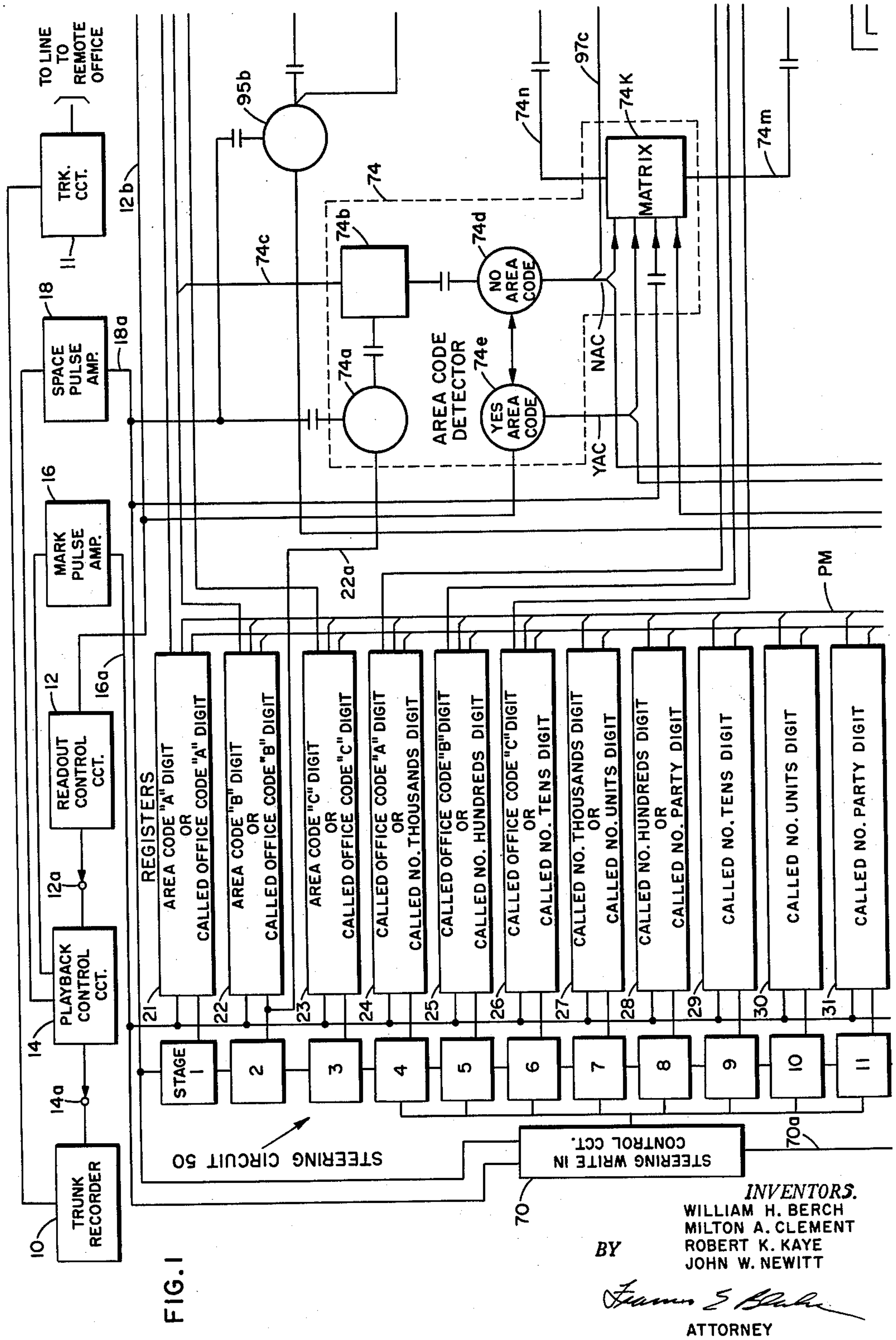
Figure 4:
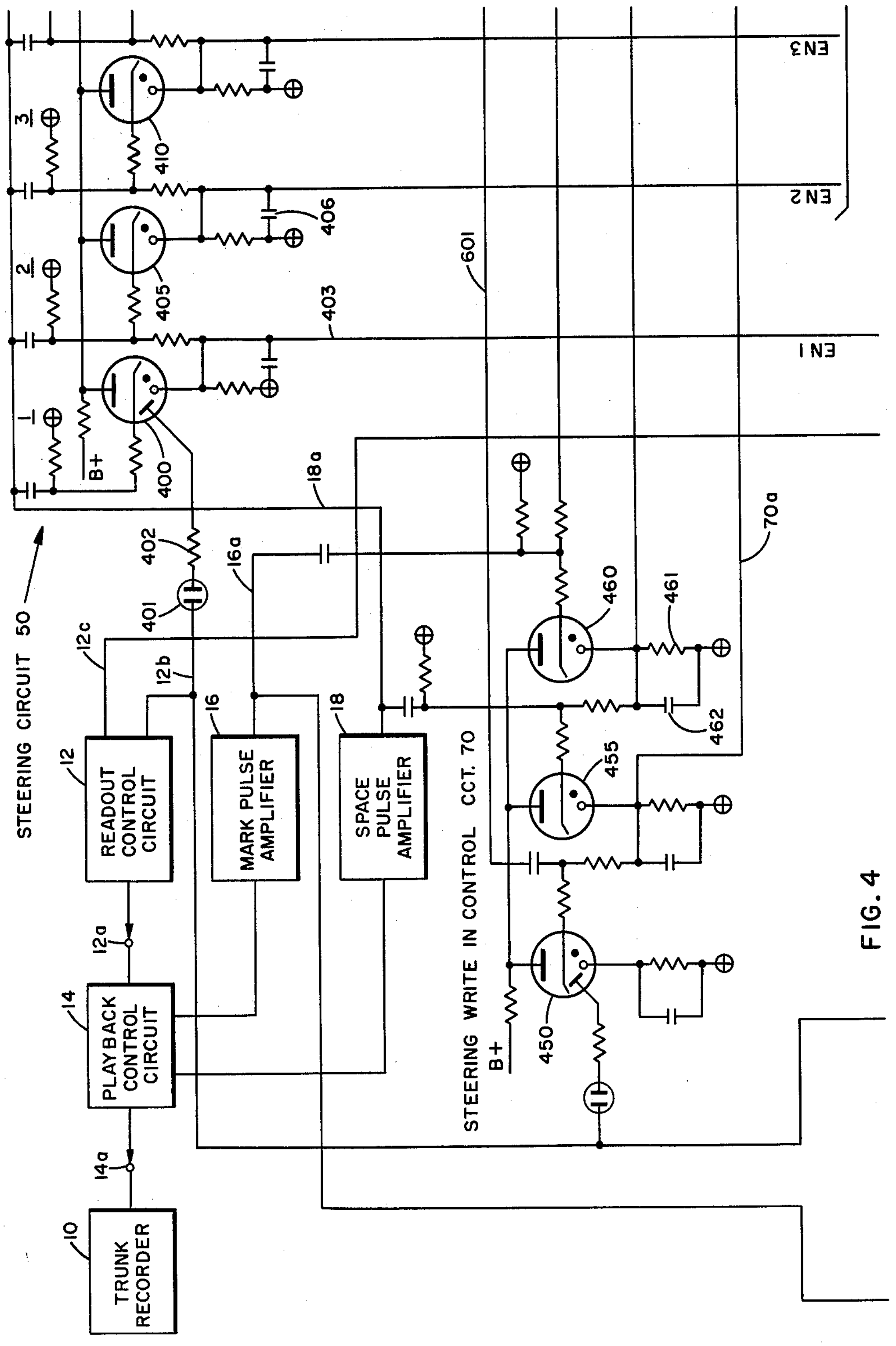
Figure 5:
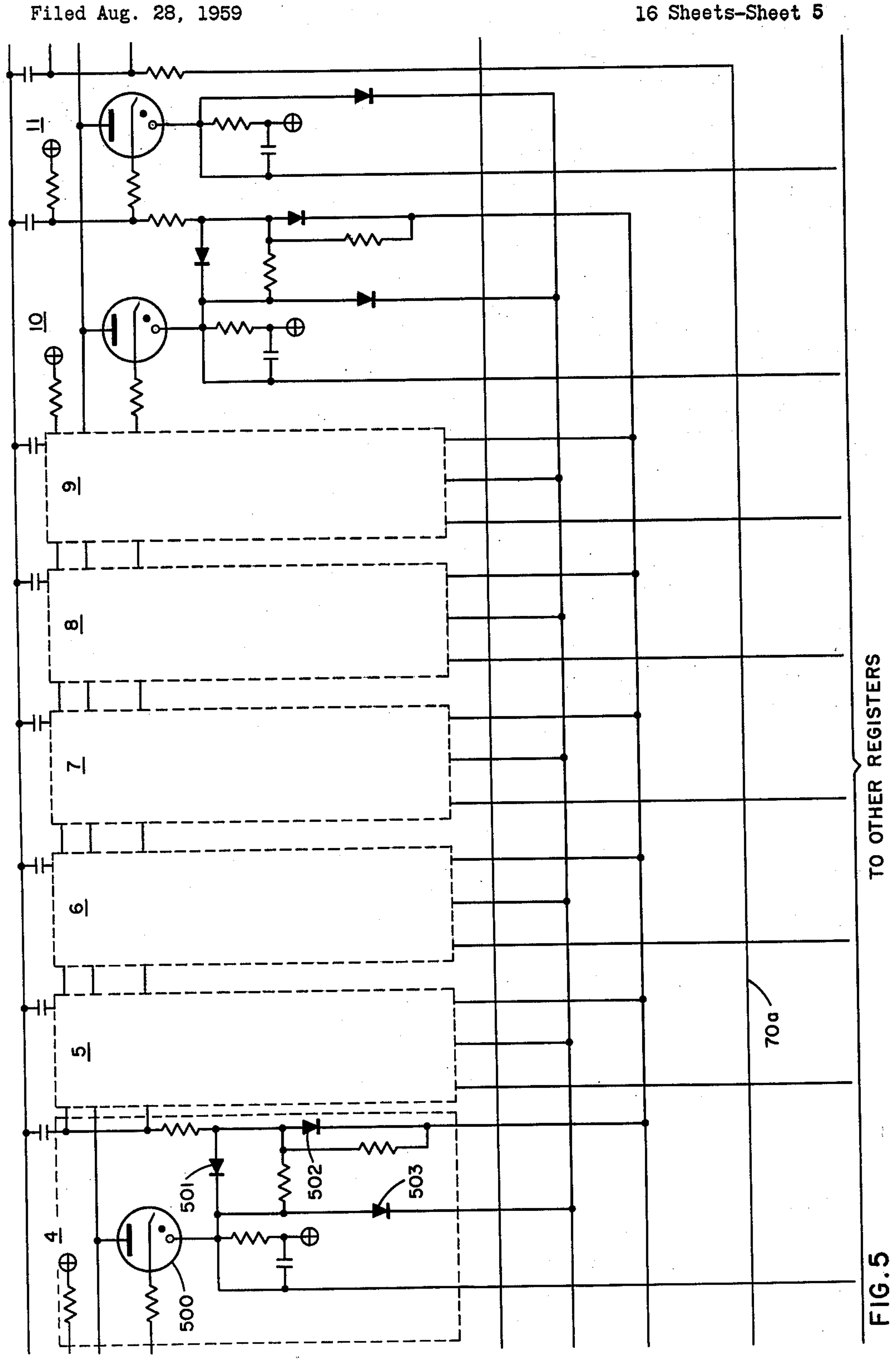
Figure 6:
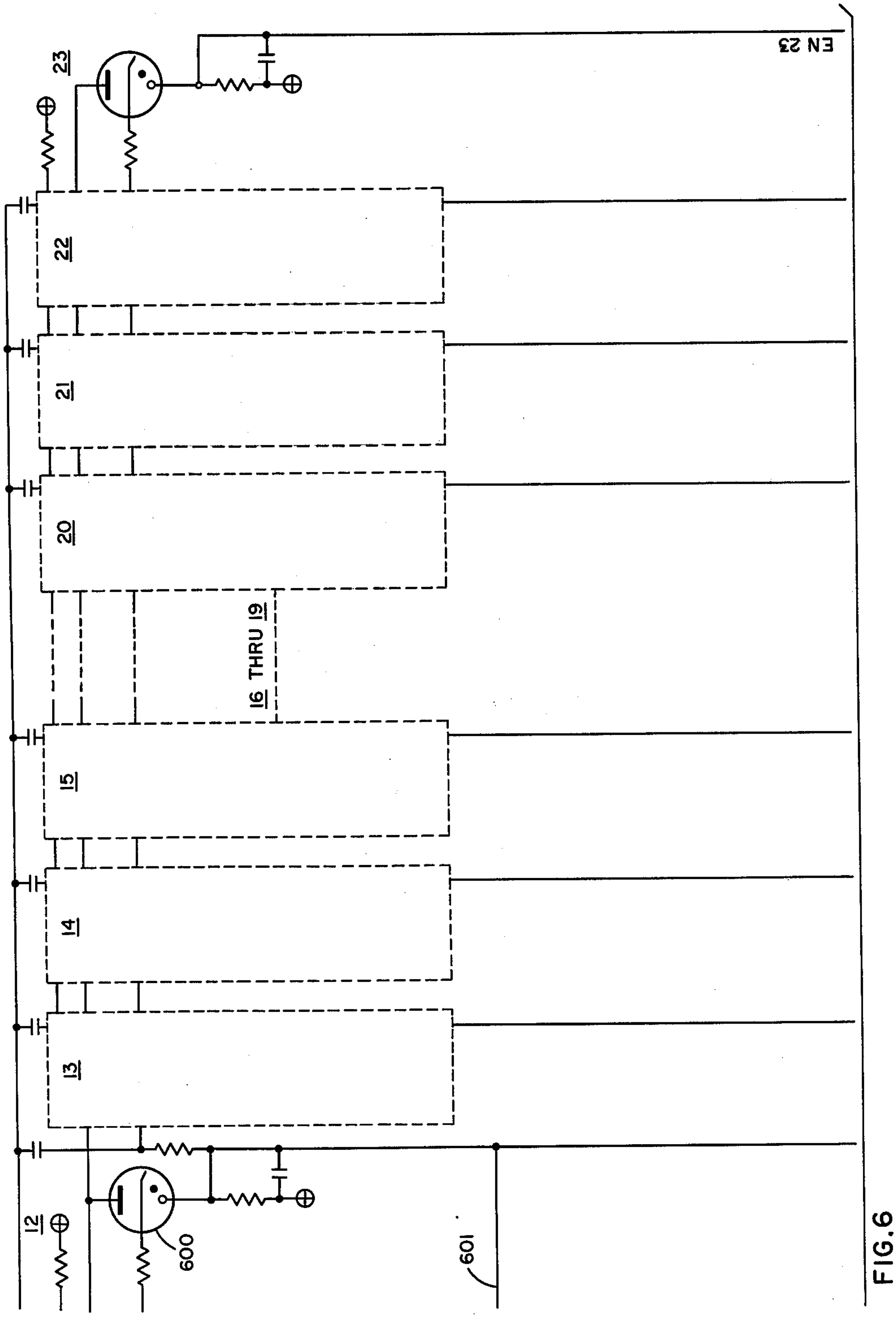

The steering circuit shown in block diagram in FIG. 1 and in more detail in FIGS. 4, 5 and 6 serves a variety of functions in a toll ticketing system. When the information that is stored on the magnetic tape associated with the trunk recorder 10 is to be read off and a permanent record made of the call, the steering circuit 50 detects the spaces which separate groups of mark pulses representing individual digits. The series of mark pulses are read from the tape and each is sequentially recorded in one of a plurality of register circuits. Each register is enabled in its turn by the successive stages of the steering circuit. In addition, the steering circuit includes a new design feature that enables it to detect two successive spaces without any intervening marks and in response thereto to enable a predetermined register.

This steering circuit is similar in its operation to the one cited in the Morris and Clement Patent No. 2,877,311.

As will be noted, the steering circuit is composed of a plurality of cold cathode tubes. The tubes are designed to fire with a potential of 72 to 105 volts on the starter anode when the main anode is at 165 volts and the cathode at zero or ground potential. The tubes, when fired, exhibit a constant potential drop of approximately 62 volts between the main anode and the cathode. A cathode resistor shunted by a capacitor is used and a current limiting resistor in the B+ anode power supply is employed. The cathode resistor is so chosen that the cathode of a conducting tube is below the potential which, if applied to the starter anode of a non-conducting tube through suitable resistors, would cause the non-conducting tube to fire. Thus, the cathode potential of a conducting tube may be applied as an enabling voltage to the starter anode of some other tube. Then when a pulse of suitable potential is received through a series capacitor at the starter anode of an enabled tube, it will cause said tube to fire.

Although the details are not shown in this drawing, the B+ power supply to the tubes is arranged to be switched. That is, when it is dseired to turn all the tubes off, the B+ power supply can be removed. The first tube 400 of the steering circuit may be primed on by the readout control circuit 12 applying a pulse of 300 volts to the lead designated 12b. The pulse passes through neon 401 and resistor 402 to apply a potential to the eyelet of the tube thereby rendering it conducting.

With tube 400 conducting, the cathode potential on lead 403 is applied to the starter anode of tube 700 thereby enabling tube 700 of the first register circuit. As will be discussed later, the register circuit is thus prepared to count mark pulses and each successive register circuit is similarly enabled by successive stages of the steering circuit. The enabling potential on lead 403 is also applied to the starter anode of tube 405. Thus, the potential of the succeeding space pulse on lead 18a from the space pulse amplifier 18 will be added to the enabling potential at the starter anode of tube 405 and tube 405 will be fired. As tube 405 fires, the anode of this tube will be lowered to approximately 62 volts since capacitor 406, until it becomes charged, effectively shunts the cathode resistor of tube 405 thereby holding the cathode at ground potential. Reducing the anode voltage of tube 405 to approximately 62 volts also lowers the anode potential of tube 400. However, the cathode potential of tube 400, while conducting, is at a potential substantially above ground potential due to the current flow in the associated cathode resistor. Furthermore the cathode capacitor of tube 400 tends to maintain the cathode potential of tube 400. Consequently, with the anode potential reduced and the cathode potential of tube 400 sustained, the resulting voltage between the anode and cathode is reduced below the sustaining value and tube 400 is extinguished.

Thus, as each space pulse is received on lead 18a, successive tubes of the steering chain will be fired until tube 500 has been fired. It will be noted that the cathode of tube 500 is not connected to the starter anode of the next tube in the same manner as the previous stages had been. More specifically, diodes 501, 502 and 503 have been introduced and the first two are shunted with resistors of approximately 1 megohm.

The direction of diode 503 permits tube 500 to enable tube 460 of the steering write-in control circuit. If it be assumed that tube 460 is not conducting then there is no current in cathode resistor 461 and the upper terminal of this resistor is at the same potential as the lower point, namely ground. Therefore, the lower terminal of diode 502 is also at ground potential. A small current will flow from the cathode of tube 500 through the resistor of approximately 1 magohm which shunts diode 501 and through diode 502 to resistor 461 and ground. However, since the resistor shunting diode 501 is large compared with resistor 461, the voltage drop across resistor 461 will be small and the upper terminal of diode 502 is substantially at ground potential. Thus, the stage of the steering chain following tube 500 is not enabled when tube 460 is not conducting.

If, on the other hand, it be assumed that tube 460 is conducting, then the cathodes of tubes 500 and 460 are at the same potential and no current is flowing in the resistor shunting diode 501. Consequently, the starter anode of the fifth stage in the steering circuit is at an enabling potential. Thus, stage 5 of the steering circuit is enabled only when stage 4 and tube 460 are conducting. In a like manner, it will be observed that stage 6 cannot be enabled by stage 5 unless tube 460 has been fired. The joint enabling of successive stages by tube 460 and the preceding stage continues through stage 11.

Since tube 460 plays such a vital roll in the operation of the steering circuit the steering write-in control circuit 70, which is shown in block diagram form in FIG. 1 and in more detail in FIG. 4, will be examined. It will be noted that tube 450 will be primed on just as tube 400 was primed on when the readout control circuit 12 places a 300 volt pulse on lead 12*b*. As has already been shown, when tube 500 is conducting the cathode potential of tube 500 serves to enable tube 460. Tube 460 may in turn be fired as mark pulses are received at its starter anode on lead 16*a* from the mark pulse amplifier 16. The firing of tube 460 reduces the anode potential of tube 450 during the charge time of capacitor 462 and therefore tube 450 is extinguished. As already stated, the firing of tube 460 serves conjointly with the fired stage of the steering circuit to enable the next stage of the steering circuit for stages 4–11. In addition, the cathode potential of tube 460 is applied to the starter anode of tube 455. Thus, tube 455 and the tube in the next stage of the steering circuit will be fired upon receipt of the next space pulse on lead 18*a*.

In summary, once stage 4 of the steering circuit has been fired, the succeeding stage of the steering circuit cannot be rendered conducting until at least one mark pulse has been received as exemplified by the firing of tube 460. Or stated differently, successive stages of the steering circuit will be fired as long as at least one mark pulse is received by the steering write-in control circuit between successive space pulses.

*Receipt of two successive space pulses without intervening mark pulses.*—If it be assumed that a space pulse has just fired one of the stages 4 to 11 of the steering circuit and tube 455, then tube 460 will not be conducting. At this time, the cathode potential of tube 455 is applied to lead 70*a* thereby enabling tube 600 which is stage 12 of the steering circuit. Therefore, if a second space pulse is received without any intervening mark pulses, then stage 12 will be fired no matter which stage of the steering circuit, after stage 4 and before stage 12, had previously been fired. That is, two successive space pulses without any intervening mark pulses will cause tube 600 of stage 12 to be fired.

It will be noted that when tube 600 is fired, a pulse is fed back on lead 601 to fire tube 450 which was enabled by tube 455. Firing tube 450 extinguishes tube 455, and firing tube 600 extinguishes whichever tube in the steering circuit had been previously conducting.

With tube 450 fired and tubes 455 and 460 extinguished, no enabling potential is applied to tubes 455 and 460 and thus they will not be fired by subsequent mark or space pulses.

It will be observed that had alternate mark or space pulses fired successive stages of the steering circuit until stage 11 is fired, that stage 12 still cannot be fired until two successive space pulses without any intervening mark pulses are received.

As was previously shown, the cathode potential of tube 400 serves as an enabling potential for tube 700, the drive tube in a register circuit. In a similar manner, the cathode potential of each succeeding stage in the steering circuit is used for enabling subsequent register circuits.

DETAILED DESCRIPTION—REGISTER CIRCUIT

The register circuits are used for temporarily recording or registering the series of mark pulses as they are read off the magnetic tape during a playback operation. The mark pulse amplifier 16 amplifies the mark signals and applies them to lead 16*a* which is multiplied to all registers 21–43. As already shown, each register is enabled, in its turn, to register receipt of mark pulses when it is enabled by the steering circuit.

As has already been discussed, the number of digits in the called number designation may vary and an area code may or may not be included. Therefore, the first register 21 may register the area code "A" digit or it may register the called office code "A" digit. Other registers, through register 28, may contain either of two possible pieces of information or perhaps no information.

In order to record the calling office code in a specific register thereby enabling proper interpretation of the pulses, the equipment has been arranged in a manner to cause two successive spaces without any intervening marks to be placed on the tape at the conclusion of the called number information. It was shown above that these two spaces would cause stage 12 of the steering circuit to be fired and that stage 12 would thereby enable register 32. From this point on, the digits appear on the tape in a specific sequence whereby the digits represented by the series of mark pulses have sequential or positional significance. Thus, each series of mark pulses after the called number may be registered in sequence in successive registers.

Later as registers 32–43 are read out for the printing of the permanent record, the significance of the intelligence carried by each register is known. Thus, although the called number consisted of a variable number of digits, all other information is caused to be recorded in specific predetermined registers.

The register circuit is similar to the steering circuit but uses a drive, or pulse, repeating tube 700. Tube 705 is primed on at the start of the readout operation in the same manner that tube 400 of the steering circuit was primed on. Thus, when tube 700 of a register circuit is enabled by the steering circuit, tube 705 is already conducting.

A cold cathode tube, in order to remain in the conducting state, must carry a certain minimum of current from the anode to the cathode. The resistor 701 in the anode circuit of tube 700 is of such a high value that it will prevent a flow of current large enough to sustain conduction in tube 700. Thus, although tube 700 may be fired by the appearance of a pulse at its starter anode, it cannot maintain conduction after capacitor 702 has discharged. Capacitor 702 is chosen to be small enough to assure that it will discharge between successive pulses to the drive tube 700.

A clipping bias of approximately 65 volts is provided on lead 12*c* by the readout control circuit 12. Thus as tube 700 fires, a voltage of approximately 65 volts appears at terminal 703 and is applied through capacitors to the starting anode of each tube in the register chain. As shown, tube 705 is already conducting and is therefore enabling tube 710 as the cathode potential of tube 705 is applied to the starting anode of tube 710. Thus, a 65 volt pulse at point 703 adds to the enabling voltage of the starter anode of tube 710 and causes it to fire. No other tubes in the chain are fired when the 65 volt pulse appears at terminal 703 as they are not enabled and 65 volts is not sufficient to fire a tube. As tube 710 fires, it causes the anode potential of tube 705 to be lowered and thereby extinguishes tube 705. This is identical to the extinguishing techniques used in the steering circuit. Tube 710 when fired will enable the tube of the next stage, and so on to the last stage of the register.

The register circuits are designed with a variable number of stages to accommodate the maximum number of pulses expected to be recorded therein. For convenience in checking the system accuracy, each register is usually provided with one more stage than the maximum number of pulses expected to be registered therein.

*Readout of registers.*—When it is desired to read the digital information recorded in a register, the steering readout circuit 86, which will be discussed later, places a pulse on a lead associated with the register to be read and the register, in turn, passes this pulse on one of a plurality of leads to translator 82 which translates the received signal into one to cause the printer or other device 80 to print information indicative of the registered information. After printing the registered information, the printer 80 places a signal on lead PP to the steering readout circuit requesting the next character. The steering readout circuit thereupon interrogates the next register and each subsequent register in its turn.

The interrogating lead PM from the steering readout circuit to the register is multipled to each stage in the register. The cathode potential of tube 705, if it is conducting, will place an enabling potential at the upper terminal of neon 706; while if tube 710 is conducting, an enabling potential will be placed at the upper terminal of neon 711. In a similar manner, each stage of the register is capable of enabling an associated neon. Since each stage of the register circuit, when fired, extinguishes the preceding stage, only one neon per register can be enabled at a time. Thus, the interrogating pulse received on the PM lead is selectively passed through the neon associated with the conducting stage of the register.

The registers may also provide information to the matrix circuits as may be required. Such information is provided as a potential on the cathode lead of the conducting stage of the register. Thus, as will be described in a subsequent section, the register cathode lead can be used to enable certain elements in a matrix so that a pulse can be put into the matrix and a unique output obtained in accordance with the enabled input lead.

As with the steering circuit, the register circuits may be restored to their standby state by removing the B+ potential from the anodes.

DETAILED DESCRIPTION—STEERING READOUT CIRCUIT

Figure 3:
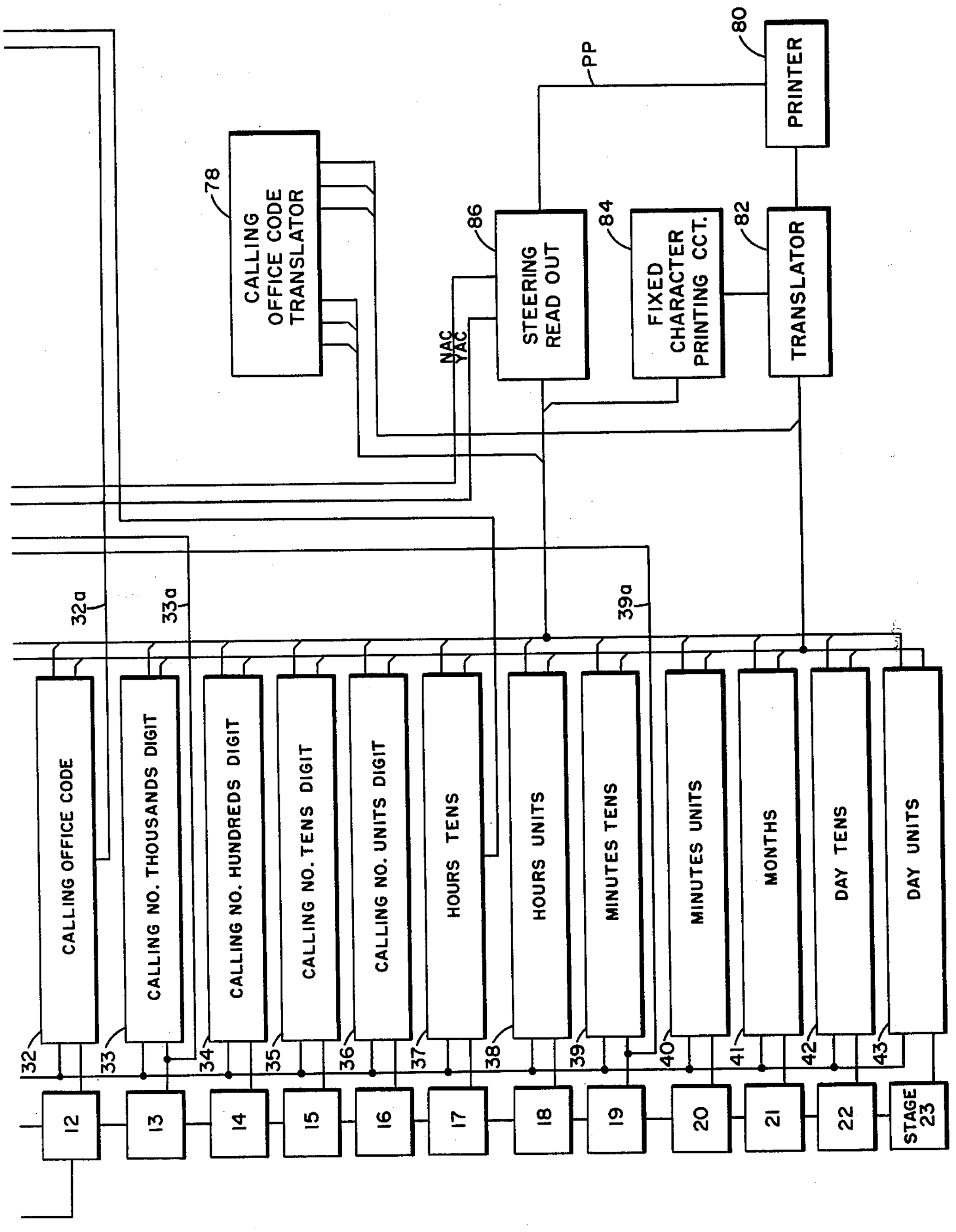
Figures 12, 20:
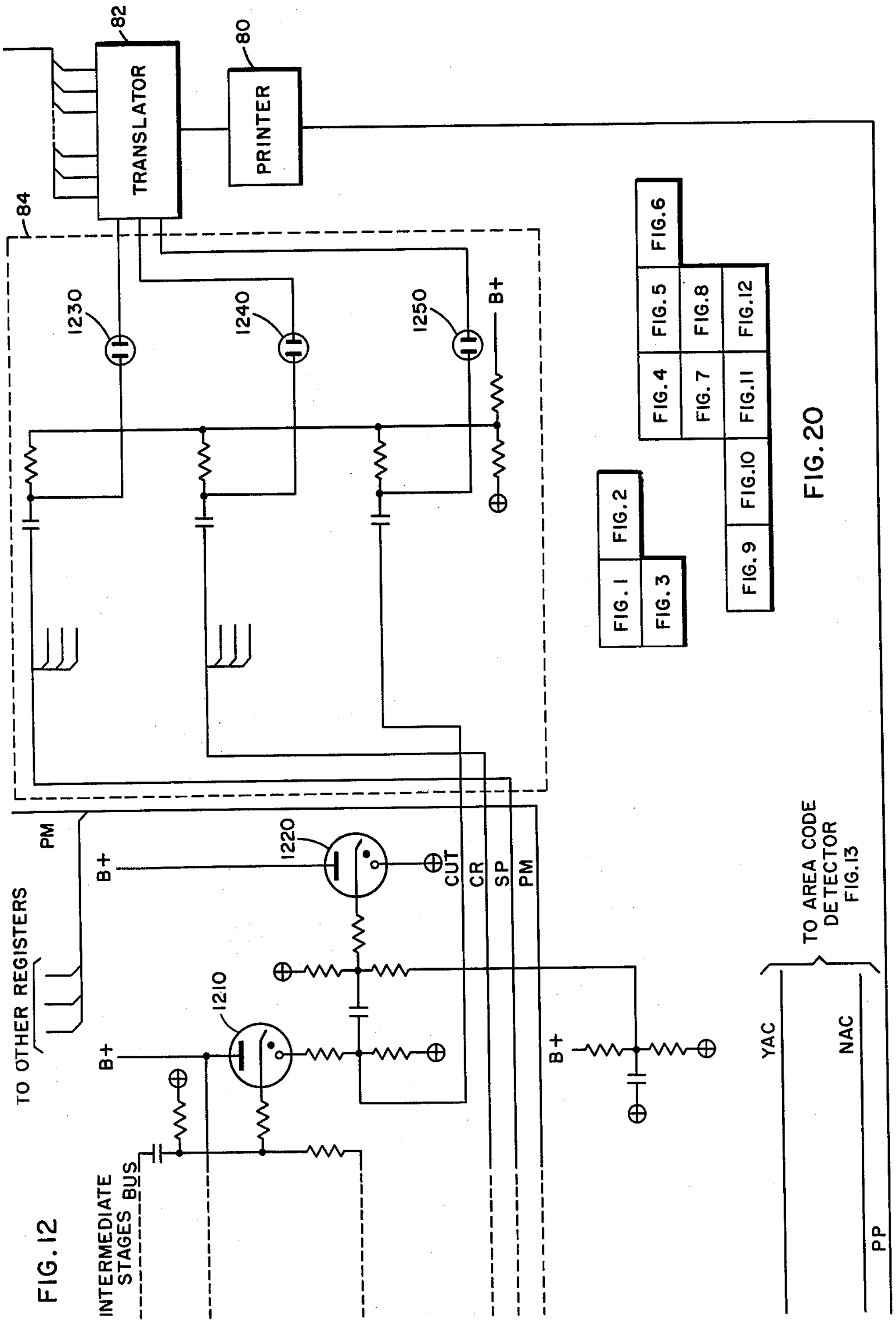

The steering readout circuit is shown in block diagram form in FIG. 3 as 86 and has been briefly described above. More details of the steering readout circuit are shown in FIGS. 9–12, inclusive, which should be arranged as shown in FIG. 20.

The principal function of the steering readout circuit is to interrogate the registers and cause an appropriate signal to be sent to the printer or other device that is used to produce the permanent record of the toll call. For convenience, it will be assumed that the printer 80 is an electrically operated typewriter that prints one character at a time. However, the system is amenable for use with other types of data processing equipment, such as punched card machines, punched tape machines or devices arranged for line-at-a-time printing. When the electric typewriter is used, a pulse is returned to the steering readout circuit on the PP lead after each character is printed. In response to each pulse on the PP lead, the steering readout circuit either interrogates one of the registers 21–43 or one of the registers in the fixed character printing circuit 84 and sends an appropriate signal to the translator 82.

An ancilliary but new and very important function is to provide a toll ticket with a uniform format irrespective of the fact that a called number may or may not include an area code.

Another ancilliary function is to provide the printer with space and carriage return signals as may be required to make an easily read ticket. For example, the ticket may take either of the following forms depending upon the presence or absence of an area code.

| With Area Code | Without Area Code |
|---|---|
| 15 12<br>12 24<br>HU2 2200<br>202<br>ST3 9300 | 15 12<br>12 24<br>HO7 5830<br><br>LY7 5242 |

The first line of the ticket gives the time the call was originated on a twenty-four hour basis. Thus, the illustrated calls were made at 3:12 P.M. The second line of the ticket gives the date the call was originated, in the illustrated cases December 24. The third line gives the calling subscriber's telephone number. The fourth line gives the area code when one is used. It will be noted that the second case illustrated uses no area code and therefore this line is left blank. However, the equipment provides a uniform format and therefore extra carriage returns are employed to place the last line, which is the called telephone number, on the same level on both tickets. The toll tickets may be typed on a roll of paper similar to adding machine paper and after each ticket is typed it may be cut from the roll.

Figure 13:
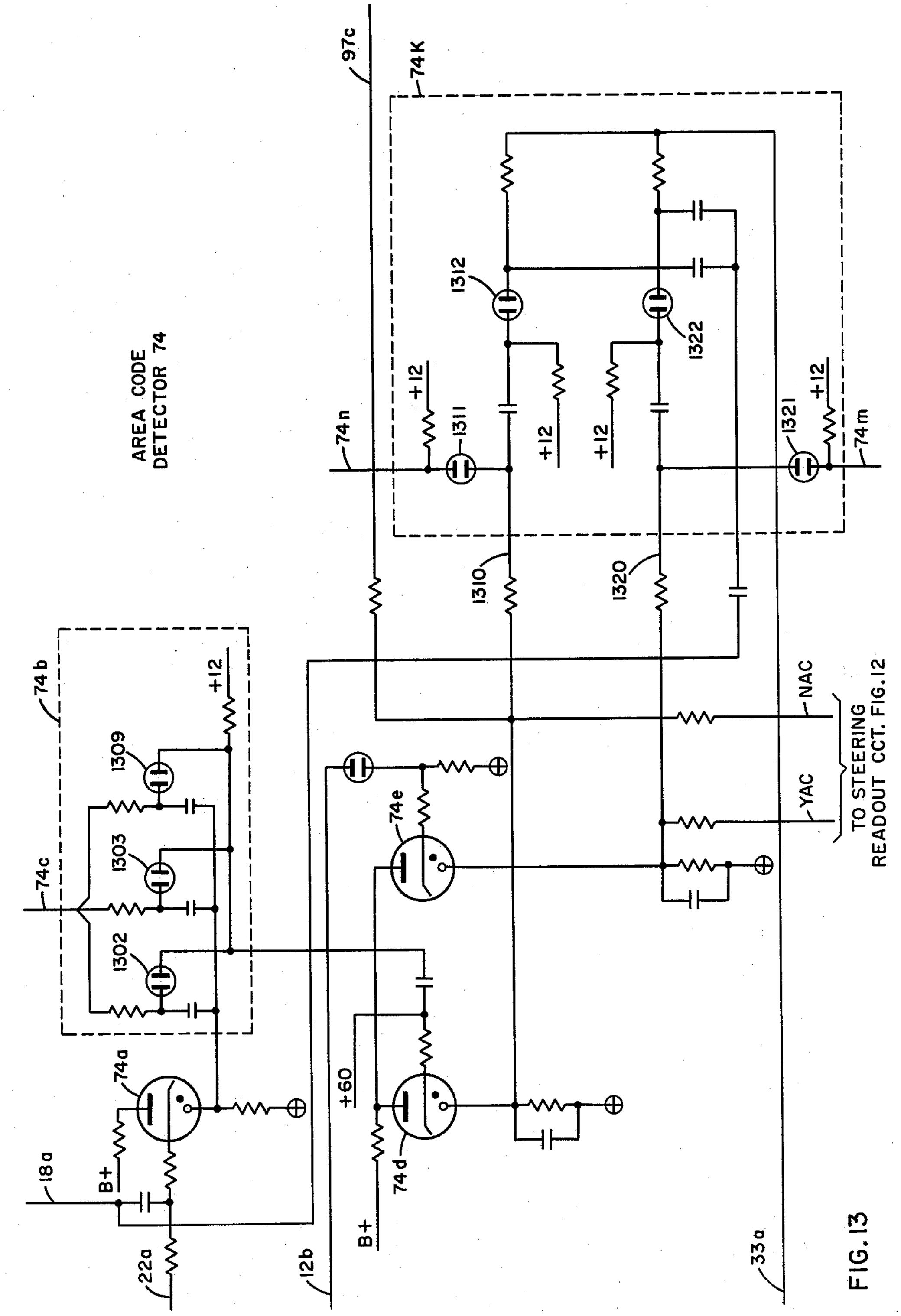

Since registers 21, 22 and 23 may have area code information or called office code information, it is necessary for the area code detector of FIG. 13 to advise the steering readout circuit which situation prevails so that the information recorded in the first three registers may be printed in the proper location on the ultimate toll ticket. Thus, it will be noted that the YAC and NAC leads extend from the area code detector, FIG. 13, to the steering readout circuit, FIG. 12. When an area code is included, the cathode potential of the YAC tube **74*e* is applied to the YAC lead while if no area code is included, the cathode potential of the NAC tube 74*d*** is applied to the NAC lead.

While the steering readout circuit is similar to other cold cathode tube circuits previously described, there is one distinct difference; the firing of one tube does not extinguish previously fired tubes. This is because the cathode resistors of the steering readout circuit tubes are not shunted with a capacitor. However, as with the cold cathode tube circuits already discussed, the cathode potential of a conducting tube is used as an enabling voltage for a subsequent tube. For some tubes an AND gate is used and they cannot be enabled unless a specific preceding tube is fired and an enabling potential is present on the YAC or NAC lead as the case may be.

Tube 900 is very similar in its operation to tube 700 of the register circuit in that the anode resistor is of such a high value that conduction cannot be sustained when it is pulsed on by a pulse on the PP lead. However, as tube 900 is momentarily pulsed on by successive pulses on the PP lead, a pulse is generated at the cathode of tube 900 and is placed on the BUS lead to connect through a plurality of capacitors to the starter anodes of each stage of the steering readout circuit. Only the stage which is enabled by having an appropriate voltage applied to its starter anode will be fired and such a stage will remain conducting until it is extinguished. It will be noted that a clipping bias is applied to the BUS lead to assure that the cathode pulses from tube 900 do not rise above a predetermined value.

Figure 7:
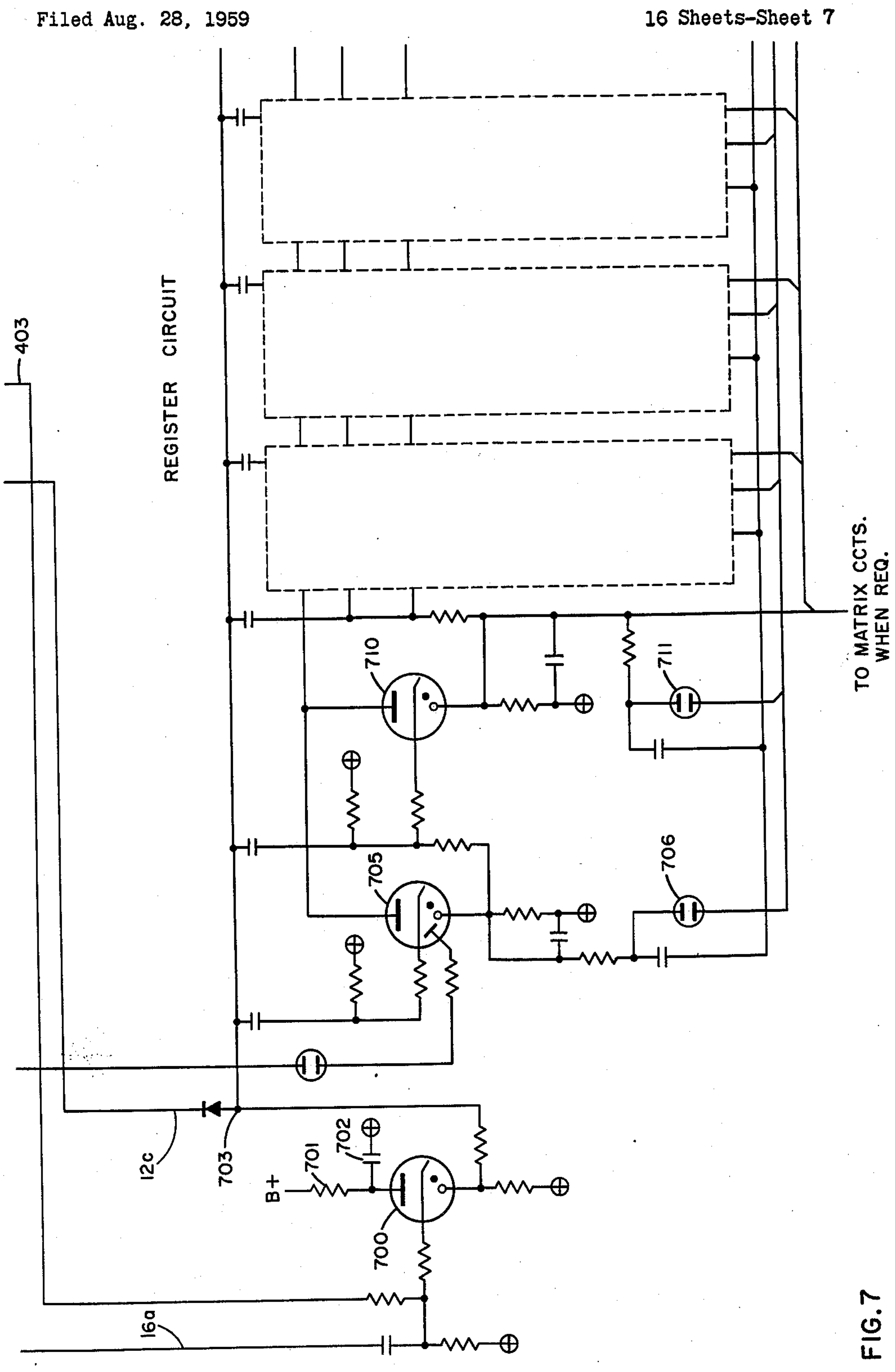
Figure 8:
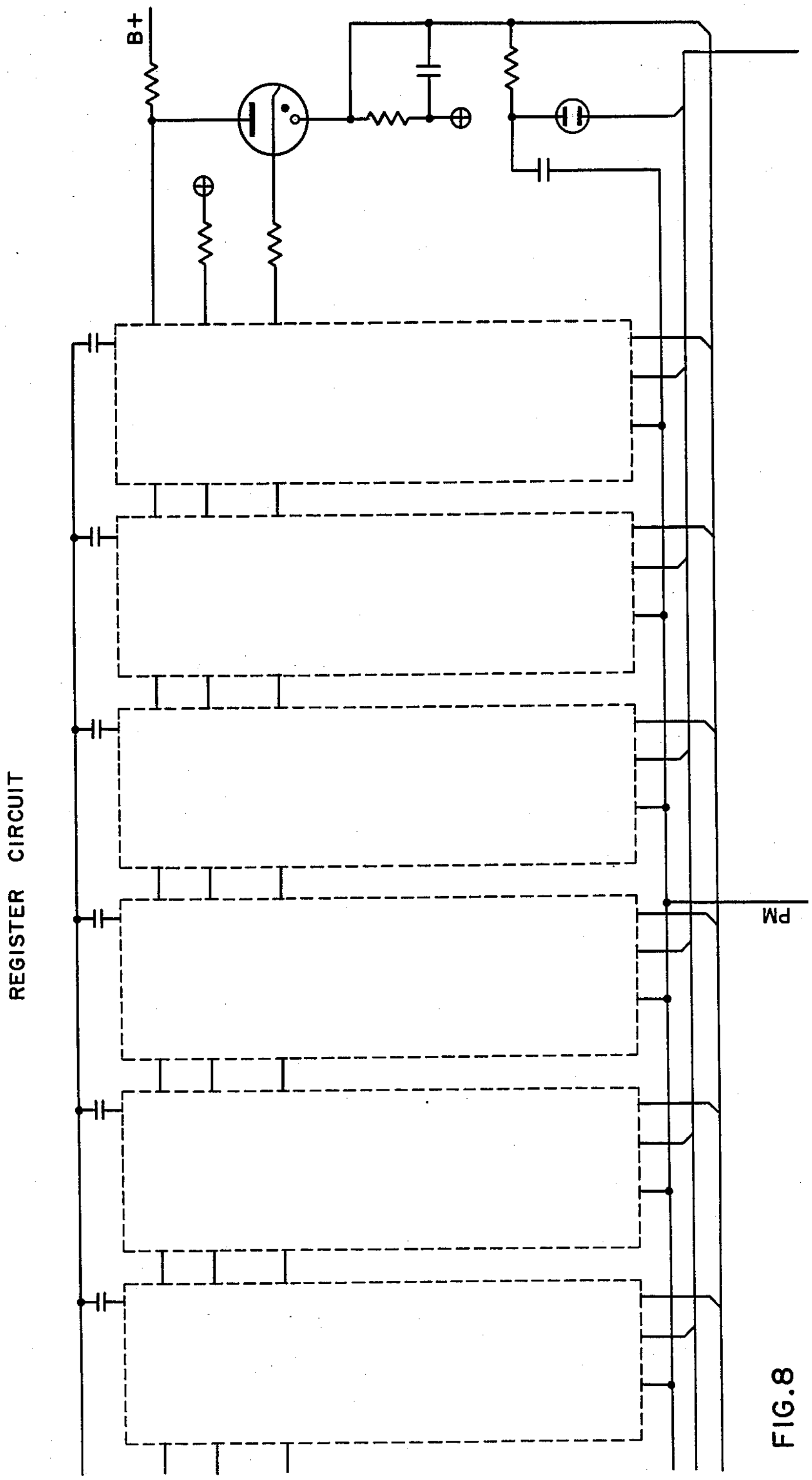
Figure 9:
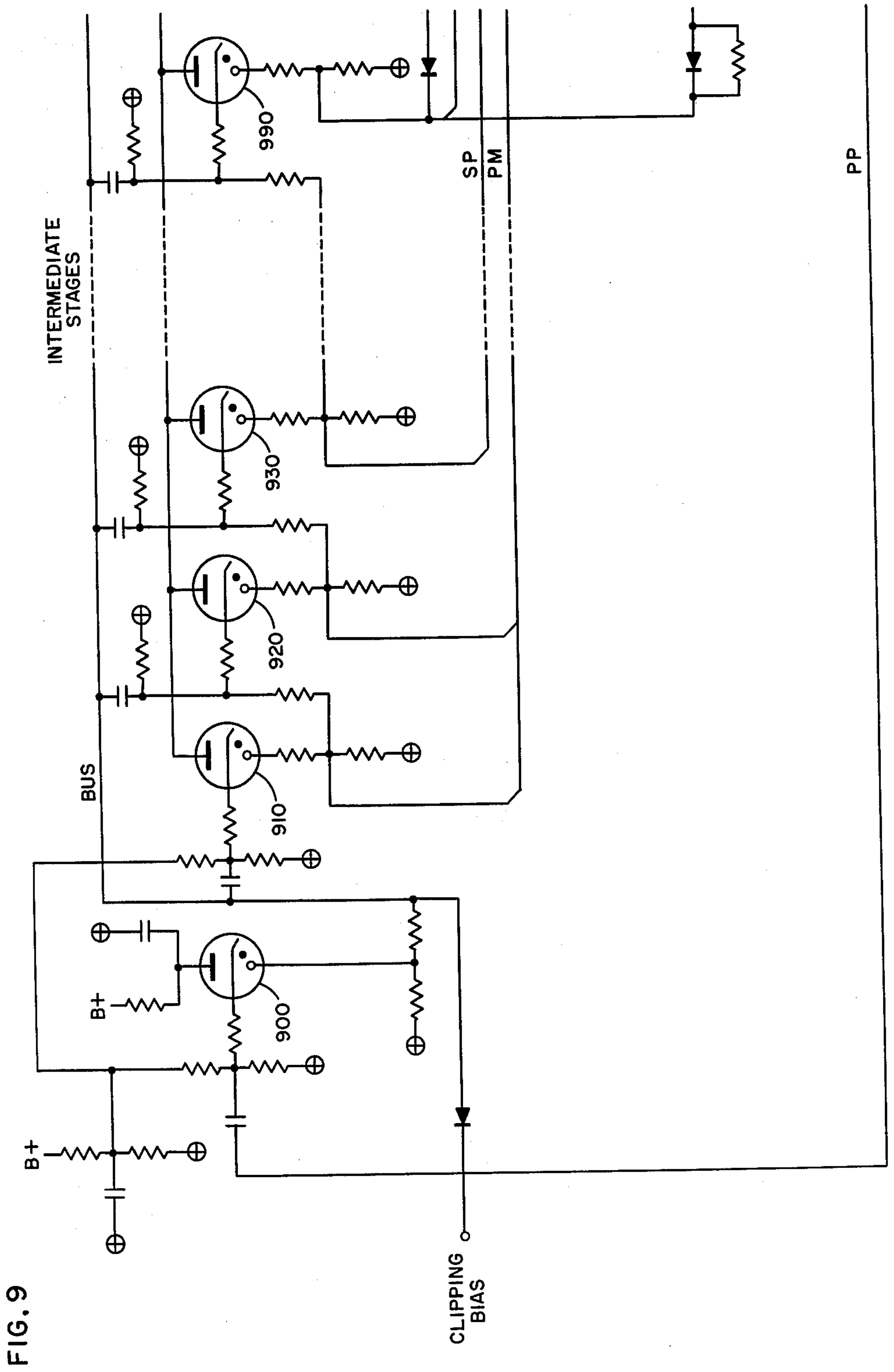
Figure 10:
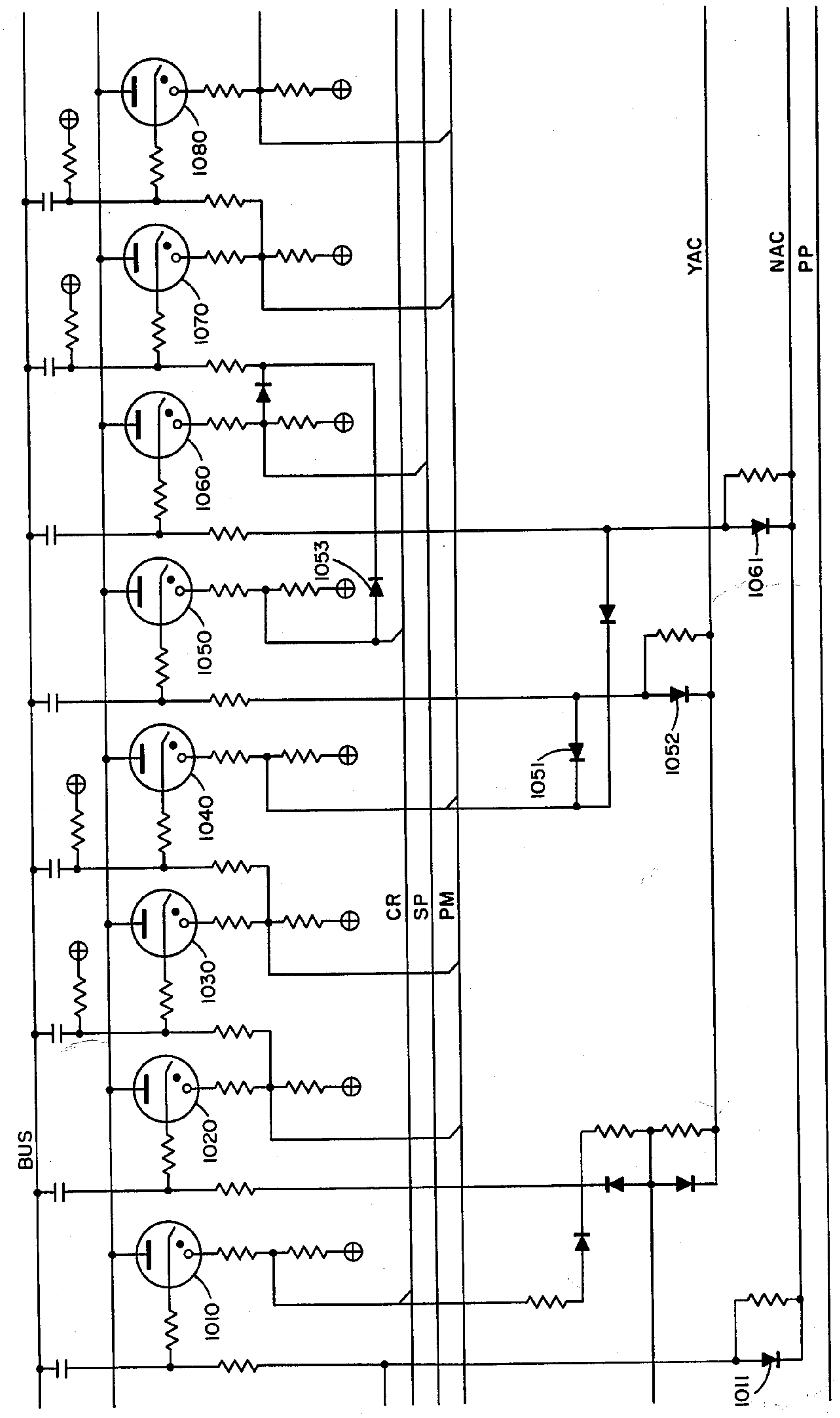
Figure 11:
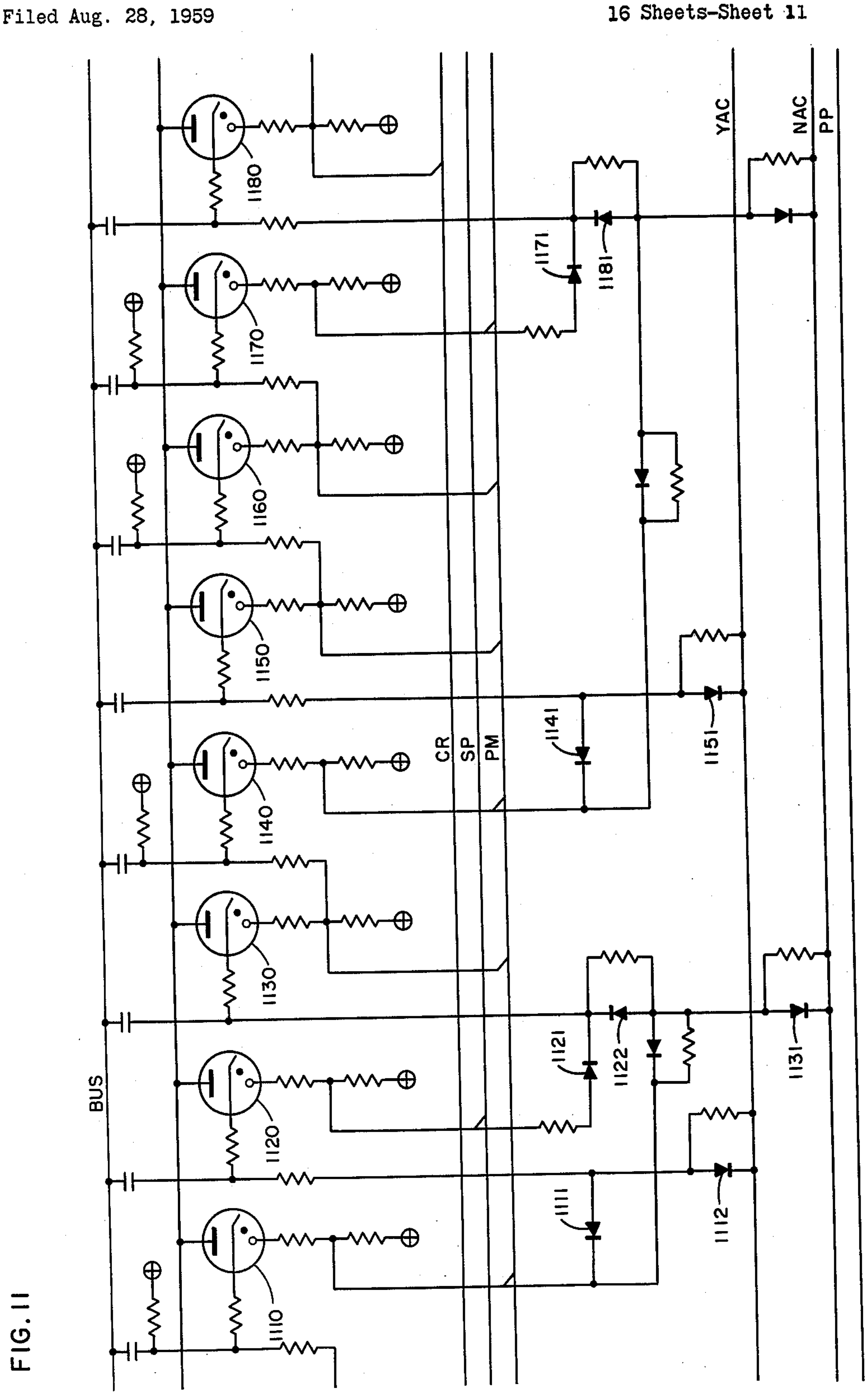

As each successive stage in the steering readout circuit is fired, a pulse will be generated at its cathode. The pulse is applied to a PM, SP, CR or CUT lead. When a pulse from the cathode of a particular stage of the steering readout circuit is applied to a PM lead, the pulse is directed to the PM lead of a particular register circuit, such as that shown in FIGS. 7 and 8. Each register, it will be recalled, has one stage that is conducting. If it be assumed that the register shown in FIGS. 7 and 8 has tube 710 conducting then neon 711 is enabled from the cathode potential of tube 710 and the pulse appearing on the PM lead from the steering readout circuit will pass through neon 711 and be forwarded to translator 82 on a selected one of a plurality of leads between the register and the translator. The translator 82 converts the signal received to the code that is required to make the printer 80 print a character indicative of the registered information.

When a pulse from the cathode of a particular stage of the steering readout circuit is applied to a CR lead, the pulse is directed to the CR lead of a particular neon in the fixed character printing circuit 84, such as neon 1240. This neon, which has an enabling bias applied thereto, passes the pulse to the translator 82 which provides a carriage return signal to the printer 80.

In a similar manner, cathode pulses on the SP leads cause pulses to be forwarded through neons, such as 1230, and a space signal is sent to the printer 80. In a similar manner, a cathode pulse on the CUT lead will pass through neon 1250 and cause a cutter associated with the printer to cut the ticket just produced from the roll.

Thus, to start producing the first ticket illustrated above, the printer 80 will furnish a pulse on the PP lead thereby firing permanently enabled tube 900 which in turn causes tube 910 to be fired. The pulse produced at the cathode of tube 910 will be applied to the PM lead associated with the hours tens register 37 and the digit registered therein will be reproduced by the printer and in response thereto the printer will place another pulse on the PP lead to fire tube 900 again and in response thereto enabled tube 920 will now be fired. The pulse produced at the cathode of tube 920 will be applied to the PM lead associated with the hours units register 38 and the appropriate digit printed. Tube 930 will be fired in response to the next PP pulse and in response to the pulse at the cathode of tube 930 a pulse will be placed on a SP lead thereby causing a space signal to be sent to the printer.

In a similar manner, the minutes tens and minutes units digits are printed. At the conclusion of the printing of the minutes units digit, a carriage return is provided and the date is printed on the next line. For simplicity and brevity, the steering readout circuit stages for controlling the reading and printing of many digits have been omitted from the drawings.

When the calling office is to be printed on the ultimate ticket, the arbitrary code that is registered in register 32 must be translated to the standard two-letter and single-digit code. Therefore, as this register is read, the calling office code translator 78 is employed to translate the single digit calling office code. Since the calling office code translator forms no part of this invention, the details thereof are not shown.

The remainder of the calling number is printed in the manner already described. Finally, when the last character of the calling number is printed, tube 990 is fired and a carriage return signal is provided to the printer.

At this point either an area code should be printed or an additional carriage return should be made and the called number printed. The choice, of course, depends upon the presence or absence of an area code. Consequently, two cases must be considered.

*Printing of ticket with an area code.*—When the ultimate ticket is to include an area code, the YAC lead has placed thereon a 60 volt potential from the cathode of tube **74*e* in the area code detector circuit of FIG. 13. The NAC lead conversely is at ground potential as the NAC tube 74*d*** is not conducting.

A diode gate is used to prevent the cathode potential of tube 990 from enabling tube 1010. That is, since the NAC lead is at ground potential, any attempt to place the starter anode of tube 1010 at any positive potential with respect to ground is thwarted by diode gate 1011. However, since the YAC lead is at a 60 volt potential, the cathode potential of tube 990 may be applied to tube 1020. That is, the diodes form an AND gate so that tube 1020 cannot be enabled unless tube 990 is conducting and an enabling potential is on the YAC lead.

Thus, tube 1020 fires and reads register 21. In the normal manner, tubes 1030 and 1040 fire to read registers 22 and 23 to cause the printing of the remaining digits of the area code.

It will be noted that diode 1061 prevents tube 1040 from enabling tube 1060 while the AND gate composed of diodes 1051 and 1052 permit tube 1050 to be enabled. Consequently, tube 1050 fires responsive to the next PP pulse and a carriage return is fed to the printer 80. As will be noted, the cathode potential of tube 1050 serves to enable tube 1070 through diode 1053. Tube 1070 fires and the called office code "A" digit is read from register 24. In the usual manner, tubes 1080 and 1110 are enabled and fired to cause the called office code "B" and "C" digits to be printed.

In the event that the called number should include fewer digits than the maximum provided for, then the last register or registers devoted to the function of registering the called number will have no digits registered therein. In this event, tube 705 of such a register will be conducting as it was primed on at the start of the readout operation. Thus, when a pulse is applied to the PM lead of such a vacant register, the pulse will be passed through neon 706 and on to the printer. The printer receives a blank or no-character signal and in response thereto, applies another pulse to the PP lead.

Diodes 1111 and 1112 form an AND gate to permit tube 1110 to enable tube 1120 while diode 1131 prevents any enabling of tube 1130. Consequently, tube 1120 is fired and a space signal is sent to the printer. Tube 1120 enables tube 1130 through diode 1121 and diode 1122 prevents the ground potential of the NAC lead from inhibiting this enabling. Thus, tube 1130 fires and register 27 containing the called number thousands digit is read and printed. Tube 1140 fires responsive to the next PP pulse and the called number hundreds digit is read and printed. Tube 1150 is enabled by tube 1140 by virtue of the potential on the YAC lead and the AND gate composed of diodes 1141 and 1151. Thus, tube 1150 fires and responsive thereto the called number tens digit is printed. In the usual manner, tubes 1160 and 1170 fire to print the called number units and party digits. Tube 1170 enables tube 1180 through diode 1171 and diode 1181 prevents the ground potential on the NAC lead from inhibiting this enabling. Thus, tube 1180 is fired and a carriage return signal sent to the printer.

Additional stages which are not shown in the steering readout circuit may be employed to read registers associated with a computer which, having been furnished rate information, can calculate the net charge for the call and cause the printer to print the charge as the last item on the ticket. Finally, tube 1210 will be fired and a CUT signal sent to the printer.

*Printing of a Ticket Without an Area Code.*—When the ultimate ticket does not include an area code, the NAC lead has placed thereon a 60 volt potential from the cathode of tube **74*d* in the area code detector circuit of FIG. 13. The YAC lead conversely is at ground potential as the YAC tube 74*e*** is not conducting.

The basic operation of the steering readout circuit when no area code is used is similar to the operation when the area code is used. The principal difference being that certain stages that were skipped over in the area code case are now not skipped but perform a function such as providing a carriage return or space signal to the printer. Also, certain stages of the steering readout circuit that were used in the area code case are skipped in the no area code case.

Since the case with the area code has been described, it is believed that it may be reviewed and the difference with the no area code case most conveniently shown by use of the following table.

*Steering Readout Circuit*

| Tube Number | Reads Register No. | Function With Area Code | Function Without Area Code |
|---|---|---|---|
| 990 | | Carriage Return | Carriage Return. |
| 1010 | | Skip | Carriage Return. |
| 1020 | 21 | Prints Area Code "A" Digit. | Prints Called Office Code "A" Digit. |
| 1030 | 22 | Prints Area Code "B" Digit. | Prints Called Office Code "B" Digit. |
| 1040 | 23 | Prints Area Code "C" Digit. | Prints Called Office Code "C" Digit. |
| 1050 | | Carriage Return | Skip. |
| 1060 | | Skip | Space. |
| 1070 | 24 | Prints Called Office Code "A" Digit. | Prints Called Number Thousands Digit. |
| 1080 | 25 | Prints Called Office Code "B" Digit. | Prints Called Number Hundreds Digit. |
| 1110 | 26 | Prints Called Office Code "C" Digit. | Prints Called Number Tens Digit. |
| 1120 | | Space | Skip. |
| 1130 | 27 | Prints Called Number Thousands Digit. | Prints Called Number Units Digit. |
| 1140 | 28 | Prints Called Number Hundreds Digit. | Prints Called Number Party Digit. |
| 1150 | 29 | Prints Called Number Tens Digit. | Skip. |
| 1160 | 30 | Prints Called Number Units Digit. | Skip. |
| 1170 | 31 | Prints Called Number Party Digit. | Skip. |
| 1180 | | Carriage Return | Carriage Return. |
| 1210 | | Cut | Cut. |

As may be seen from the circuit and from the table, a particular stage of the steering readout circuit can read only one predetermined register or furnish one predetermined type of signal, such as carriage return or space to the printer. For example, tube 990 furnishes a carriage return signal in either case and tube 1040 causes the steering readout circuit to read register 23 which contains the area code "C" digit when an area code is used and contains the called office code "C" digit when no area code is involved. Thus, the potential from the area code detector circuit on the YAC lead or the NAC lead conditions the steering readout circuit to enable it to read the registers 21–43 and produce a toll ticket of uniform format irrespective of the fact that the called number may or may not include an area code.

DETAILED DESCRIPTION—AREA CODE DETECTOR

The area code detector is shown in block diagram form in FIG. 1 and has been briefly described above. More details of the area code detector are shown in FIG. 13, which should be examined in conjunction with FIGS. 1, 2 and 3. As has already been stated, registers 21, 22 and 23 may have registered therein either area code information or called office code information. The function of the area code detector is to determine which of the two possible situations prevail for a given call. It will be recalled that this may be rather readily determined by examining register 22 and if it has registered therein either the digit 1 or 0 then an area code has been registered; while if register 22 has registered any other digit, namely 2–9, then no area code is registered therein.

The determination of the value of the registered digit is obtained by examining the cathode potential of the stages of the register that would be conducting if any of the digits 2–9 have been registered. It will be recalled that only one stage in the register will be conductive and that its cathode will be at a potential of approximately 57 volts. Thus, the eight leads from the cathodes represented collectively by lead 74c for the stages which register the digits 2–9 of register 22 may be individually wired to neons such as 1312, 1303 and 1309. Additional neons are used but are not shown in order to simplify the drawing. Thus, if no area code is registered, a selected one of the neons will be enabled by one of the cathodes in register 22.

It will be noted that when stage 2 of steering circuit 50 enabled register 22 that through lead 22a, tube 74a was also enabled. Then at the conclusion of the registration of the second digit a space pulse is placed on lead 18a. This space pulse will, in addition to advancing the steering circuit one stage and thereby enabling register 23, fire enabled tube 74a. The firing of tube 74a will raise the cathode potential of this tube and thereby forward a pulse through the one of the neons 1302, 1303—1309 that may be enabled. The pulse passed through the neon will fire tube 74d which was already enabled by a 60 volt potential applied to the starter anode. Tube 74d is known as the NO AREA CODE tube as it is fired only when an area code is not registered in register 22. It should be observed that tube 74e, the YES AREA CODE tube, was primed on at the start of the readout operation by the 300 volt pulse on lead 12b. In the familiar manner, when tube 74d is fired, tube 74e will be extinguished.

In summary, the area code detector will have the NO AREA CODE tube 74d fired when there is no area code included in the called number and the YES AREA CODE tube 74e will be fired when an area code is included. The steering readout circuit is advised which condition prevails through the NAC lead and the YAC lead. In addition, matrix 74k is provided with a signal potential from the cathode of the YES AREA CODE tube 74e on lead 1310 when an area code is included and with a signal voltage from the cathode potential of the NO AREA CODE tube 74d on lead 1320 when no area code is present. In addition, when a no area code condition prevails, the cathode potential of tube 74d is placed on lead 97c in order to enable tube 97 which will be discussed later.

The potential on either lead 1310 or 1320 will cause the enabling of neon 1311 or 1321. Then after all the information that is required for rate determination has been registered, the enabling potential that enabled register 33 will be placed on lead 33a thereby enabling neons 1312 and 1322. The next space pulse on lead 18a will pass a pulse through matrix 74k and provide an output pulse on either lead 74m or 74n depending upon whether neon 1321 or 1311 was enabled.

The output pulse from matrix 74k is sent to the called office code matrix.

DETAILED DESCRIPTION—CALLED OFFICE CODE MATRIX

Figure 2:
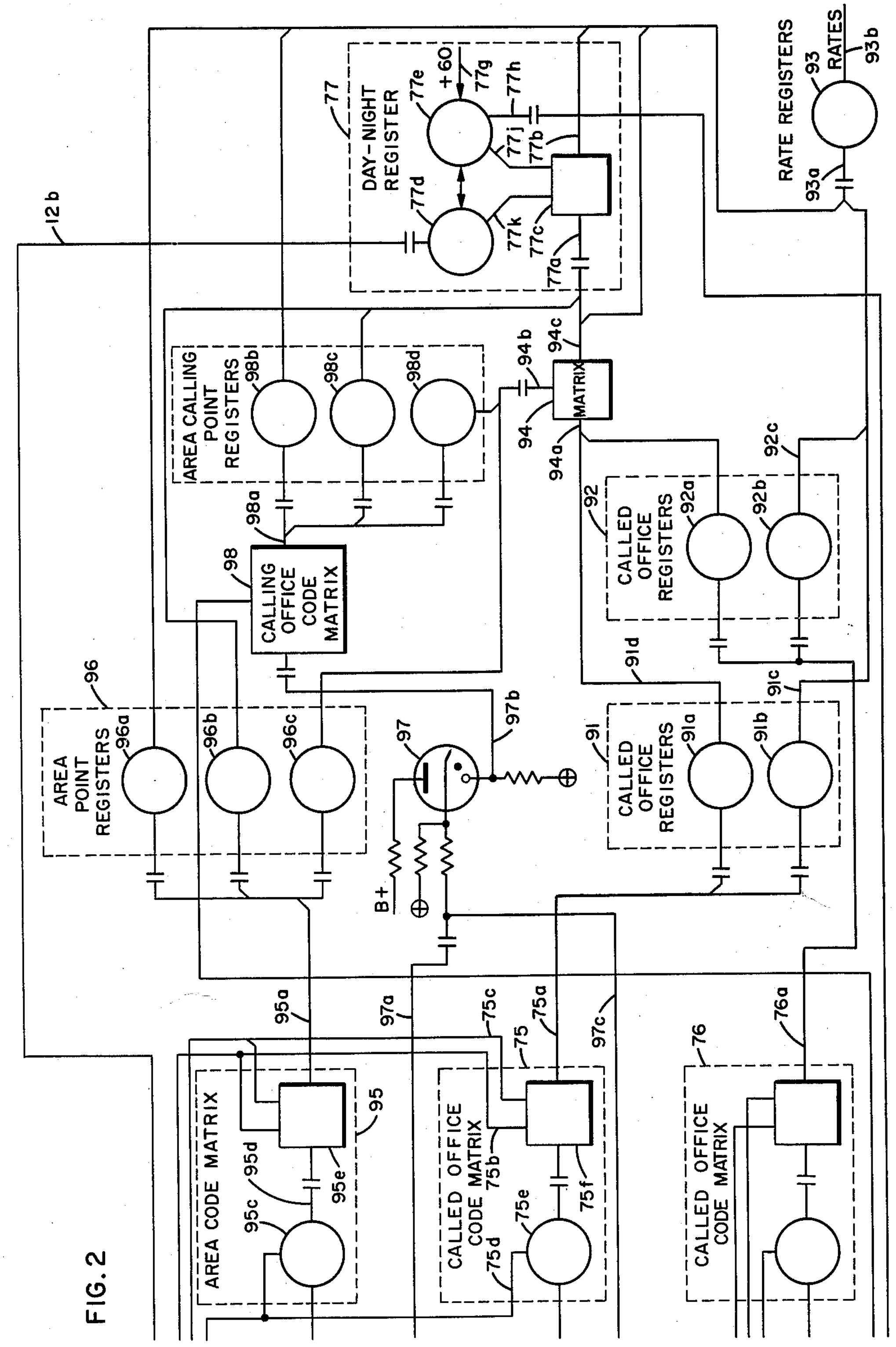
Figure 14:
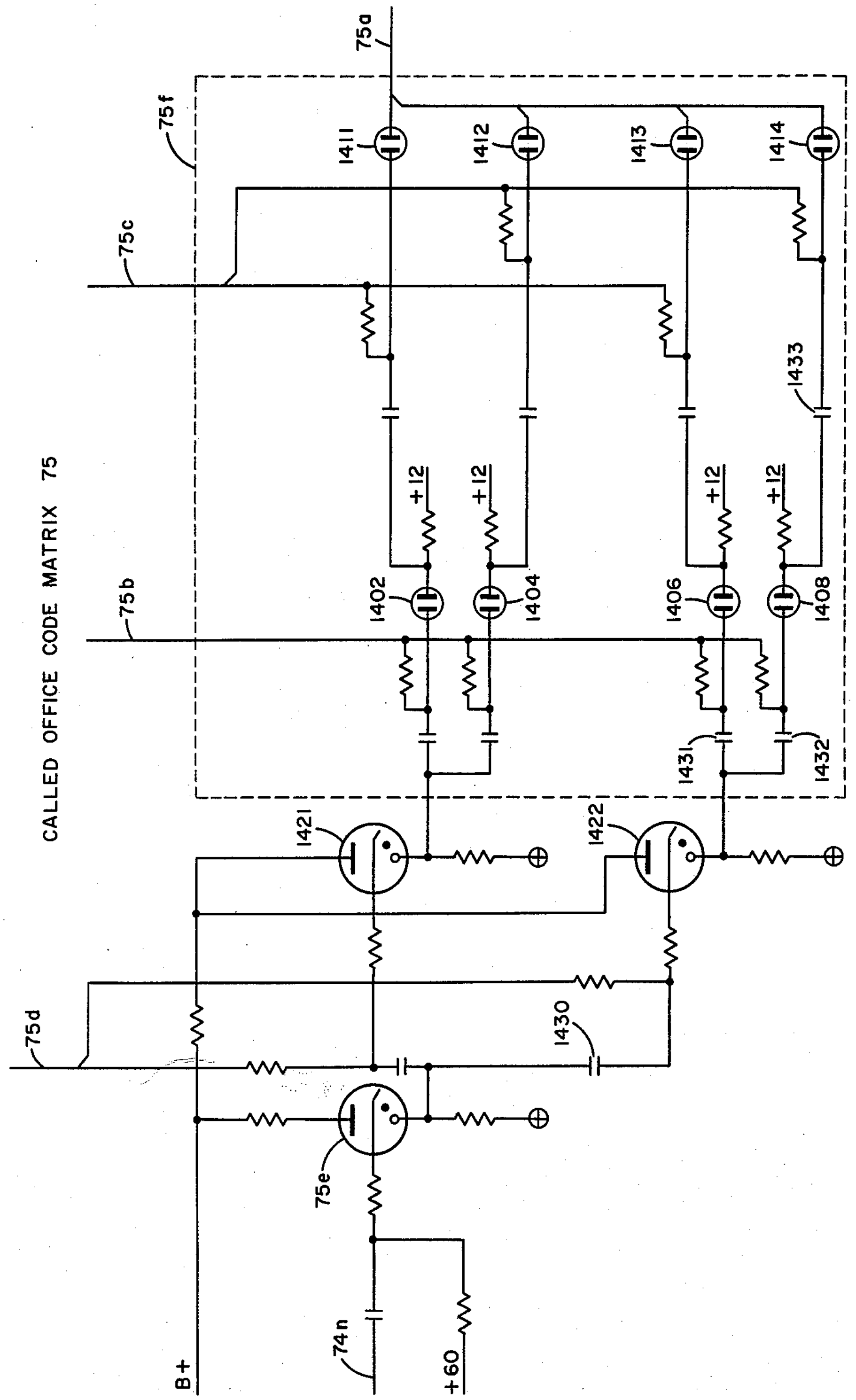

The called office code matrices are shown in block diagram form in FIG. 2 and have been briefly described above. More details of a called office code matrix are shown in FIG. 14 which should be examined in conjunction with FIGS. 1, 2 and 3.

Two called office code matrices are provided. It will be noted that when the area code detector passes a pulse on lead 74m, the pulse is conducted to called office code matrix 76 while if the area code detector passes a pulse on lead 74n, it is conducted to called office code matrix 75. Thus, the called office code matrix 76 is the one that is used when an area code is present and called office code matrix 75 is used when no area code is present.

The called office code matrix 75 interrogates the first three registers as they will have registered therein the called office code when no area code is included. The called office code matrix 76 interrogates the second group of three registers, namely registers 24, 25 and 26, as they will have registered therein the called office code when an area code is included. Thus, two called office code matrices are employed and the correct one is chosen to interrogate the necessary registers in accordance with the determination the area code detector made with respect to the presence of an area code.

The two called office code matrices are, for all practical purposes, identical and therefore only one need be discussed here.

In general, the purpose of the called office code matrix is to furnish an output pulse in response to an input pulse in such a manner that the output pulse is on a unique lead indicative of the particular called office code involved. The matrix receives three enabling conditions, one from each register containing called office code information; then when the pulse is received from the area code detector, it is routed through the matrix in accordance with the enabling and an output pulse obtained on a unique one of a plurality of output leads.

As a convenience in examining and explaining the called office code matrix, the major amount of the duplicated elements have been eliminated. The register which has registered therein the called office code "A" digit places an enabling voltage on a single one of a plurality of leads represented collectively by lead **75*b*. This enabling potential will enable a group of neons such as 1402, 1404, 1406 and 1408** and others not shown.

In a similar manner, the register having registered therein the called office code "B" digit will place an enabling voltage on a single one of a plurality of leads represented collectively by lead **75*c*. This enabling potential will enable a group of neons, such as 1411, 1413 and others not shown. An enabling potential placed on a different one of the plurality of leads from the register with the "B" digit of the called office code might enable neons 1412, 1414 and others not shown. For this discussion, it will be assumed that the enabling potential enabled neons 1412 and 1414**.

In a similar manner, the register having registered therein the called office code "C" digit will place an enabling potential on a single one of a plurality of leads represented collectively by lead **75*d*. This enabling potential will enable a selected one of a plurality of tubes such as 1421 or 1422 or others not shown. For this discussion, it will be assumed that tube 1422** is enabled. Thus, for this discussion, it will be assumed that all even numbered neons or tubes are the ones which are enabled by the associated registers.

Tube **75*e* is a drive tube and it will be noted that it is enabled by a 60 volt potential at its starter anode. This tube will be fired by the appearance of a pulse from the area code detector on lead 74*n*. The pulse generated at the cathode as tube 75*e* fired will pass through capacitor 1430 and fire enabled tube 1422. In turn, tube 1422 passes a pulse through capacitors 1431 and 1432 to fire enabled neons 1406 and 1408. Note that enabled neons 1402 and 1404 do not fire. The pulse passed through neon 1408 continues through capacitor 1433 and fires neon 1414. Note that since neon 1413 was not enabled that the pulse to neon 1406 did not fire neon 1413, or any other neon. Consequently, a single output pulse is obtained through neon 1414 and this pulse is passed on a selected one of a plurality of leads represented collectively by lead 75*a* to the called office register 91**.

Had called office code matrix 76 been used, the output pulse would have appeared on lead **76*a* and would be passed to the called office register 92**.

DETAILED DESCRIPTION—AREA POINT REGISTERS, CALLED OFFICE REGISTERS AND RATE REGISTERS

The area point registers, called office registers and rate registers are shown in block diagram form in FIG. 2 as 96, 91 or 92, and 93, respectively. More details of these circuits may be seen in FIG. 15 which should be examined together with FIGS. 1, 2 and 3 positioned as shown in FIG. 20.

Figure 15:
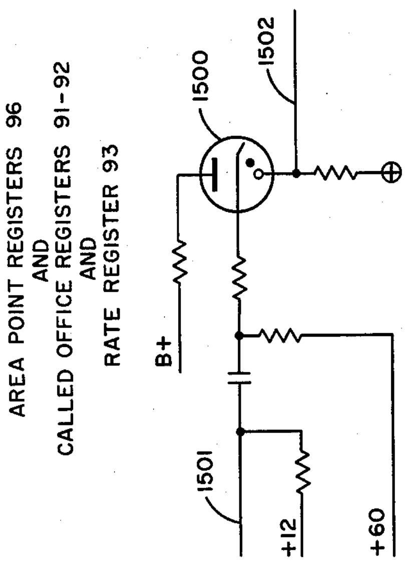

FIG. 15 illustrates a single register. It should be understood that a plurality of identical registers are provided in whatever quantity is required. Each register is adapted to receive an input pulse on lead 1501 and provide an output signal on lead 1502.

For example, it has been shown that the called office code matrix provides an output pulse on lead **75*a* and as may be seen from FIG. 2, this pulse may be directed to a selected one of a plurality of area point registers, such as that shown in FIG. 15. Thus, the appearance of a pulse on lead 1501 will cause tube 1500 to fire as it is already enabled by the application of a 60 volt potential to its starter anode. When tube 1500 fires, it will raise its cathode to approximately 57 volts and thereby provide an output signal on lead 1502**.

As may be seen from FIG. 2, the output signal of the various registers may be directed to a variety of other circuits depending upon which register is involved, what strapping is used and the nature of the call.

DETAILED DESCRIPTION—AREA CALLING POINT REGISTERS

Figure 16:
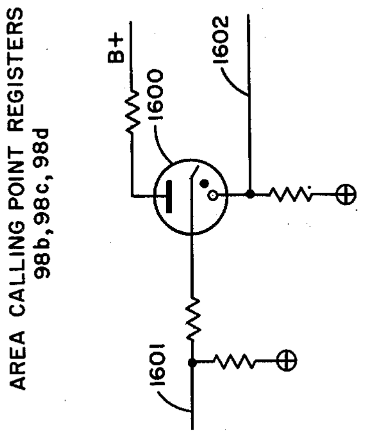

The area calling point registers are shown in block diagram form in FIG. 2 as **98*b*, 98*c* and 98*d*. More details of this circuit may be seen in FIG. 16 which should be examined together with FIGS. 1, 2 and 3 arranged as shown in FIG. 20. FIG. 16 illustrates an area calling point register. It should be understood that a plurality of identical registers are provided in whatever quantity is required. Each register is adapted to receive a pulse on lead 1601 and provide an output signal on lead 1602. As may be seen from FIG. 2, the area code matrix provides a pulse to a selected one of the area calling point registers. The pulse is of a sufficiently high voltage that it will cause tube 1600 to fire when the pulse is applied to lead 1601. The firing of tube 1600 causes an output signal to be placed on lead 1602**.

As with the registers discussed in the preceding section, the output voltage of these area calling point registers may be directed to a variety of other circuits depending upon which register is involved, what strapping is used and the nature of the call.

DETAILED DESCRIPTION—MATRIX 94

Figure 17:
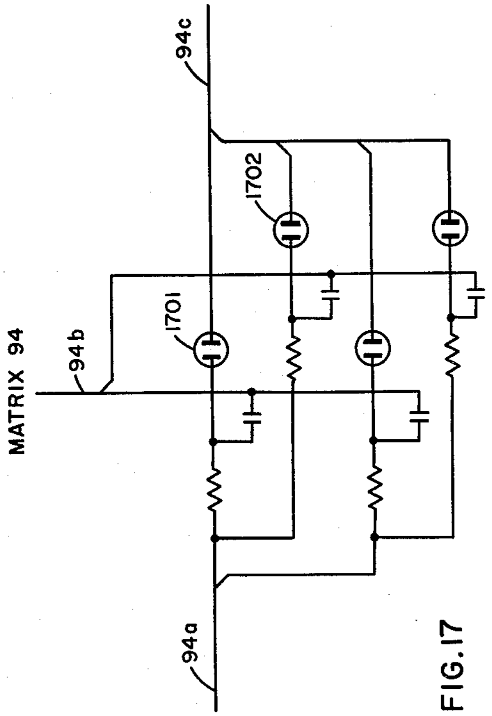

The matrix designated as 94 in FIG. 2 and illustrated in more detail in FIG. 17 accepts an enabling potential from called office registers on a selected one of a plurality of leads designated collectively as **94*a*. The enabling potential applied to the matrix will enable, for example, neons such as 1701 and 1702. It should be understood that as many enabling leads and neons are employed as may be required. After the enabling voltage has been applied to one of the plurality of leads designated collectively as 94*a*, a pulse will be placed on a selected one of a plurality of leads designated collectively as 94*b*. The particular lead to which the pulse is applied will cause one of the enabled neons to fire and pass an output pulse on a selected one of the plurality of leads designated as 94*c***.

DETAILED DESCRIPTION—CALLING OFFICE CODE MATRIX

Figure 18:
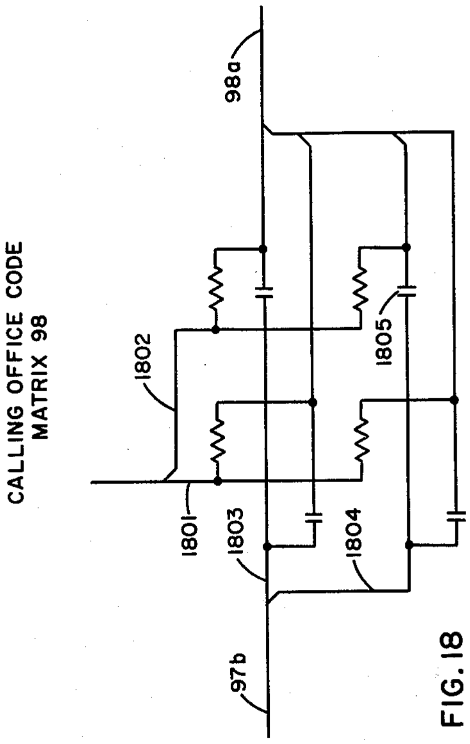

The calling office code matrix is designated in block diagram form in FIG. 2 as 98 and is illustrated in more detail in FIG. 18.

The calling office code matrix is used when the calling office code must be considered in the rate determination. Register 32 which has registered therein information indicative of the calling office provides an enabling potential on a selected one of a plurality of leads, such as 1801 or 1802. Then at a later time a pulse is applied to a selected one of a plurality of leads such as 1803 or 1804. If it be assumed that the enabling potential and the pulse are applied respectively to leads 1802 and 1804 then a pulse will be passed through capacitor 1805 to a selected one of a plurality of output leads designated collectively as **98*a***.

DETAILED DESCRIPTION—DAY-NIGHT REGISTER

Figure 19:
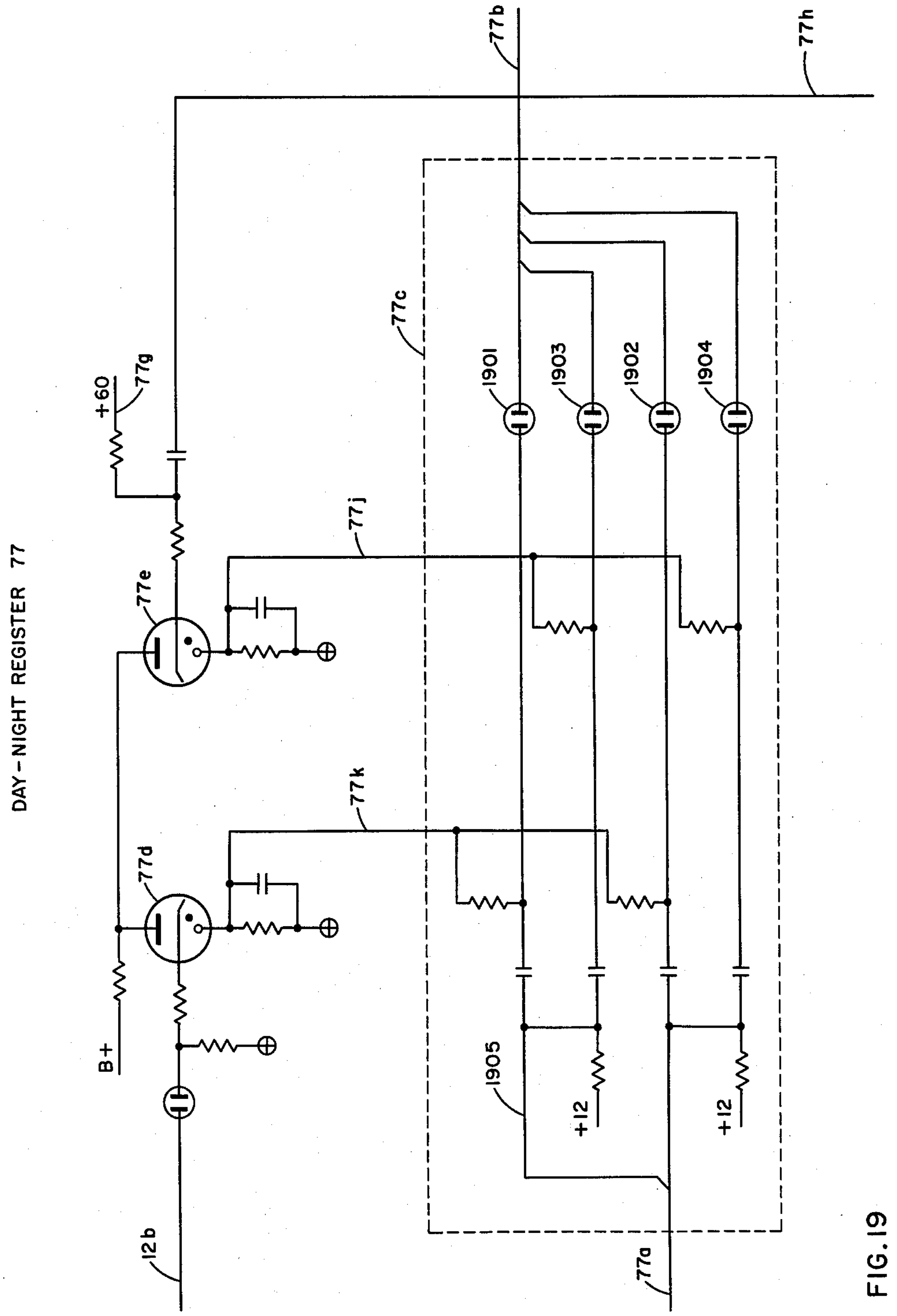

The day-night register is shown on FIG. 2 in block diagram form and designated there as 77. Additional circuit details are shown in FIG. 19.

It is conventional in computing telephone charges to consider the time of day that the call was originated at the calling end and to charge a reduced rate during specified hours. Therefore, the day-night register must be used to determine the time the call was originated and to direct each incoming pulse to either of two output leads depending upon whether the call is to be charged at the day or night rate. Thus, in principle, there are two output leads for each input lead. In isolated cases, there is no difference in rates based upon the time of day and therefore the rate pulses for such calls do not have to be routed through this equipment.

The day-night register includes two tubes, the day rate tube 77$d$ and the night rate tube 77$e$. The start of a readout operation will cause the day rate tube 77$d$ to be primed only by a 300 volt pulse on lead 12$b$. Thus, the equipment assumes the day rate is to be charged unless the night rate tube is subsequently fired. As has been discussed in an earlier section, the night rate tube will be fired if the hours tens register 17 receives more than a predetermined number of pulses. The firing of the night rate tube 77$e$ will, of course, extinguish the day rate tube 77$d$. If the day rate tube remains fired, an enabling potential is applied to lead 77$k$ while if the night rate tube is fired an enabling potential is applied to lead 77$j$. In the former case, neons 1901 and 1902 will be enabled while in the latter case, neons 1903 and 1904 will be enabled. Later a pulse is applied to a selected one of the plurality of input leads designated collectively as 77$a$. If it be assumed that the night rate is to be charged and that therefore neons 1903 and 1904 are enabled and that the input pulse is placed on lead 1905 then neon 1903 will pass the pulse on one of the output leads represented by 77$b$. The pulse will be passed to a rate register tube 93 shown in FIG. 2 which in turn connects to the computer and indicates to the computer the rate to be charged for the call under consideration.

SUMMARY—FIGS. 13–19

FIGS. 13–19, inclusive, have illustrated the details of the various registers and matrices employed in the rate determining portion of the system. It has been shown how enabling voltages are obtained from particular registers and how a pulse is passed through various matrices in accordance with the enabling to provide a single signal pulse which is uniquely indicative of a plural digit code. Furthermore, two such unique signals representing different bits of information necessary for the rate determination may be merged to obtain another unique signal which is now indicative of the combined codes. In a similar manner, all necessary registered information is considered and fed to and through matrices until a single output signal is produced which is indicative of the rate to be charged for the particular call.

It is obvious that for certain calls some items of registered information need not be considered. For example, in a cross-country call from a New York City exchange, the calling exchange is of no concern. That is, the rate is the same irrespective of the calling exchange. However, a call from a New York City exchange to Newark, New Jersey, just across the river, may be a one mile call from some New York City exchanges and a forty mile call from other New York City exchanges. Here it is fairly obvious that rate discrimination based upon calling exchange is justified. Consequently, strapping provisions are made for the rate determining pulses to go through or bypass any particular matrix as may be required.

Although the operation of the telephone system of the present invention is described above in conjunction with particular means for reading recorded information pertaining to toll calls, it should be understood that many other modifications and embodiments may be provided by those skilled in the art which will fall within the spirit and scope of the principles of the present invention.

What is claimed and desired to be secured by Letters Patent of the United States is:

1. In a toll ticketing telephone system, a source of first pulses, a source of second pulses, a pulse-operated steering circuit having a plurality of steps including a predetermined step and adapted to respond to pulses from said first and second pulse sources, means for controlling said steering circuit to advance from one step to the next successive step in response to the receipt of each pulse from said first pulse source only if at least one pulse is received from said second pulse source between successive pulses from said first pulse source, and means responsive to the receipt of two successive pulses from said first pulse source without an intervening pulse from said second pulse source for controlling said steering circuit to advance directly to said predetermined step, irrespective of the number of steps that would otherwise be required to advance to said predetermined step.

2. The combination set forth in claim 1 in which means responsive to said steering circuit advancing to said predetermined position are provided for enabling said steering circuit to advance in response to each pulse from said first pulse source irrespective of the receipt of intervening pulses from said second pulse source.

3. In a toll ticketing telephone system, a source of first pulses, a source of second pulses, a pulse-operated steering circuit having a plurality of steps including a predetermined step and adapted to respond to pulses from said first and second pulse sources, means for controlling said steering circuit to advance from one step to the next successive step in response to the alternate receipt of pulses from said first and second pulse source in the named sequence, means for preventing the advancement of the pulse-operated steering circuit responsive to the receipt of a plurality of pulses from said second pulse source between successive pulses from said first pulse source, and means responsive to the receipt of two successive pulses from said first pulse source without any intervening pulses from said second pulse source for advancing said steering circuit directly to said predetermined steps irrespective of the number of steps which would otherwise be required to advance to said predetermined step.

4. The combination set forth in claim 3 in which means responsive to said steering circuit advancing to said predetermined position are provided for enabling said steering circuit to advance in response to each pulse from said first pulse source irrespective of the receipt of intervening pulses from said second pulse source.

5. In a toll ticketing telephone system, a source of first pulses, a source of second pulses, a pulse-operated steering circuit having a chain of gas-filled tubes including a predetermined tube and adapted to respond to pulses from said first and second pulse sources, means for said pulse-operated steering circuit to respond to pulses from said first pulse source, a control circuit including gas-filled tubes and adapted to be responsive to pulses from said second pulse source and thereafter to be responsive to a pulse from said first pulse source, means in said control circuit for registering receipt of a pulse from said second pulse source means responsive to the receipt of a pulse from said first pulse source for erasing the registration of a pulse from said second pulse source from said control circuit, means in the pulse-operated steering circuit for enabling the response of said control circuit to pulses from said second and first pulse sources after a predetermined number of pulses from said first pulse source, means in said control circuit when enabled for controlling the enabling of successive tubes in the pulse-operated steering circuit responsive to the alternate receipt of a pulse from said first pulse source and at least one pulse from said second pulse source whereby the pulse-operated steering circuit advances one stage for each pulse from said first pulse source, means in said control circuit when enabled for enabling the predetermined one of the tubes in the pulse-operated steering circuit responsive to the receipt of a pulse from said first pulse source, and means for rendering said predetermined tube conductive responsive to the receipt of the next pulse from said first pulse source when there are no intervening pulses from said second pulse source.

6. The combination set forth in claim 5 having means responsive to the conduction of said predetermined tube for disabling said control circuit whereby the pulse-operated steering circuit may advance one step in response to the receipt of each pulse from said first pulse source irrespective of the receipt of intervening pulses from said second pulse source.

7. In a toll ticketing telephone system, a source of first pulses, a source of second pulses, a pulse-operated steering circuit having a chain of gas-filled tubes including a predetermined tube and adapted to respond to pulses from said first and second pulse sources, control means having first and second operated conditions, an enabled and disabled condition of said control means, means for successively rendering tubes in the pulse-operated steering circuit conducting responsive to the receipt of pulses from said first pulse source, means in the pulse-operated steering circuit for enabling said control means after the receipt of a predetermined number of pulses from said first pulse source, means in said control circuit when enabled for assuming a first operated condition responsive to the receipt of at least one pulse from said second pulse source means in said control circuit for assuming a second operated condition after said first operated condition responsive to the receipt of a pulse from said first pulse source, means in said control circuit for reverting to said first operated condition from said second operated condition in response to the receipt of at least one pulse from said second pulse source, means including said control means in said first operated condition for enabling the next tube after the conducting tube of the pulse-operated steering circuit, and means in said control means when in said second operated condition for enabling the predetermined one of the tubes in said chain.

8. The combination set forth in claim 7 having means responsive to the conduction of the predetermined tube for disabling said control means whereby the pulse-operated steering circuit is rendered responsive to all pulses from the first source irrespective of any pulses from the second source.

9. In a toll ticketing telephone system, a steering circuit comprising a plurality of stages of pulse-operated gas-filled tubes, a source of first pulses, a source of second pulses, a predetermined one of a plurality of register circuits each comprising a plurality of stages of pulse-operated gas-filled tubes, a control circuit having means responsive to the receipt of a pulse from said first pulse source and at least one pulse from said second pulse source between successive pulses from said first pulse source for advancing said steering circuit one stage at a time, means responsive to each advancement of the steering circuit for selectively enabling said register circuits in a predetermined sequence, means in said register circuits when enabled for registering pulses from said second pulse source in response to the receipt thereof, and means in said control circuit responsive to the receipt of two pulses from said first pulse source without any intervening pulses from said second pulse source for advancing said steering circuit to the position whereby said predetermined register is enabled.

10. The combination set forth in claim 9 in which means for disabling said control circuit in response to the enabling of said predetermined register are provided.

11. In a toll ticketing telephone system, a source of first pulses, a source of second pulses, a pulse-operated steering circuit having a plurality of stages including a predetermined stage and adapted to respond to pulses from said first and second pulse sources, first advancing means for controlling the pulse-operated steering circuit to advance one stage in response to the receipt of each pulse from said first pulse source only if at least one pulse from said second pulse source is received between successive pulses from said first pulse source, means responsive to the advancement of the pulse-operated steering circuit to the stage immediately preceding said predetermined stage for rendering said first advancing means ineffective for the next advancement of the pulse-operated steering circuit, and second advancing means for advancing the pulse-operated steering circuit to said predetermined stage in response to the receipt of two successive pulses from said first pulse source without any intervening pulses from said second pulse source.

12. The combination set forth in claim 11 having means responsive to the pulse-operated steering circuit advancing to said predetermined stage in response to said second advancing means for enabling said steering circuit to advance in response to each pulse from said first pulse source irrespective of the receipt of intervening pulses from said second pulse source.

13. In a toll ticketing telephone system, a source of first pulses, a source of second pulses, a pulse-operated steering circuit having a plurality of stages including a predetermined stage and adapted to respond to pulses from said first and second pulse sources, first advancing means for controlling the pulse-operated steering circuit to advance one stage in response to the alternate receipt of a pulse from said first pulse source and at least one pulse from said second pulse source in the named sequence, means responsive to the advancement of the pulse-operated steering circuit to the stage immediately preceding said predetermined stage for rendering said first advancing means ineffective for the next advancement of the pulse-operated steering circuit, and second advancing means for advancing the pulse-operated steering circuit to the predetermined stage in response to the receipt of two successive pulses from said first pulse source without any intervening pulses from said second pulse source.

14. The combination set forth in claim 13 having means responsive to the pulse-operated steering circuit advancing to said predetermined stage in response to said second advancing means for enabling said steering circuit to advance in response to each pulse from said first pulse source irrespective of the receipt of intervening pulses from said second pulse source.

15. In a toll ticketing telephone system, a source of first pulses, a source of second pulses, a pulse-operated steering circuit having a plurality of stages including a predetermined stage and adapted to respond to pulses from said first and second pulse source, means for controlling the pulse-operated steering circuit to advance in response to the receipt of pulses from said first pulse source, a control circuit having means for responding to pulses from said second pulse source, first advancing means in said control circuit for controlling the pulse-operated steering circuit to permit the advancement of the steering circuit one stage for each pulse from said first pulse source only when said control circuit has responded to at least one pulse from said second pulse source after the preceding advancement of the steering circuit, means responsive to the advancement of said steering circuit to the stage immediately preceding the predetermined stage for rendering said first advancing means ineffective for the next advancement of said steering circuit, second advancing means for advancing the steering circuit to the predetermined stage in response to the receipt of two successive pulses from said first pulse source without any intervening pulses from said second pulse source.

16. The combination set forth in claim 15 having means responsive to the steering circuit advancing to said predetermined stage in response to said second advancing means for disabling said control circuit whereby the steering circuit is rendered responsive to each pulse from said first pulse source irrespective of the receipt of intervening pulses from said second pulse source.

17. In a toll ticketing telephone system, a source of first pulses, a source of second pulses, a pulse-operated steering circuit having a plurality of stages of gas-filled tubes including a predetermined stage and adapted to respond to pulses from said first and second pulse sources, means for the pulse-operated steering circuit to respond to pulses from said first pulse source, a control circuit including gas-filled tubes and adapted to be responsive to pulses from said second pulse source and thereafter to be responsive to a pulse from said first pulse source, means in said control circuit for registering the receipt of a pulse from said second pulse source, means responsive to the receipt of a pulse from said first pulse source for erasing the registration of a pulse from said second pulse source from said control circuit, means in the pulse-operated steering circuit for enabling the response of said control circuit to pulses from said second and first pulse sources, respectively, after a predetermined number of pulses from said first pulse source, first advancing means in said control circuit when enabled for controlling the enabling of successive tubes in the pulse-operated steering circuit responsive to the alternate receipt of a pulse from said first pulse source and at least one pulse from said second pulse source whereby the pulse-operated steering circuit advances one stage for each pulse from said first pulse source, means responsive to the advancement of the pulse-operated steering circuit to the stage immediately preceding the predetermined stage for rendering said first advancing means ineffective for the next advancement of the pulse-operated steering circuit, and means responsive to the pulse-operated steering circuit advancing to the stage immediately preceding the predetermined stage for advancing the pulse-operated steering circuit one stage in response to the receipt of two successive pulses from said first pulse source without any intervening pulses from said second pulse source.

18. The combination set forth in claim 17 having means responsive to the pulse-operated steering circuit advancing to said predetermined stage in response to two successive pulses from said first pulse source for enabling the pulse-operated steering circuit to advance in response to each pulse from said first pulse source irrespective of intervening pulses from said second pulse source.

19. In a toll ticketing telephone system, a source of first pulses, a source of second pulses, a pulse-operated steering circuit having a plurality of stages of gas-filled tubes including a predetermined stage and adapted to respond to pulses from said first and second pulse sources, control means having enabled and disabled conditions and first and second operated conditions in said enabled condition, means for successively rendering tubes in said steering circuit conducting responsive to the receipt of pulses from said first pulse source, means in said steering circuit for enabling said control means responsive to the receipt of a predetermined number of pulses from said first pulse source, means in said control circuit when enabled for assuming said first operated condition responsive to the receipt of at least one pulse from said second pulse source and for subsequently assuming said second operated condition responsive to the receipt of a pulse from said first pulse source, means in said control circuit for reverting to said first operated condition from said second operated condition in response to the receipt of at least one pulse from said second pulse source, means including said control means in said first operated condition for enabling the next tube after the conducting tube of the pulse-operated steering circuit unless the next tube is in said predetermined stage, and means responsive to said steering circuit advancing to the stage immediately preceding the predetermined stage for preventing the further advancement of the pulse-operated steering circuit until two successive pulses from said first pulse source are received without any intervening pulses from said second pulse source.

20. The combination set forth in claim 19 having means responsive to the pulse-operated steering circuit advancing to said predetermined stage in response to two successive pulses from said first pulse source for enabling the pulse-operated steering circuit to advance in response to each pulse from said first pulse source irrespective of the receipt of intervening pulses from said second pulse source.

21. In a toll ticketing telephone system, a steering circuit comprising a plurality of stages of pulse-operated gas-filled tubes, a source of first pulses, a source of second pulses, a predetermined one of a plurality of register circuits each comprising a plurality of stages of pulse-operated gas-filled tubes, a control circuit having means responsive to the receipt of a pulse from said first pulse source and at least one pulse from said second pulse source between successive pulses from said first pulse source for advancing said steering circuit one stage at a time, means responsive to each advancement of the steering circuit for selectively enabling said register circuits in a predetermined sequence, means in said register circuits when enabled for registering pulses from said second pulse source in response to the receipt thereof, and means responsive to said steering circuit being stepped to the stage wherein the register immediately preceding the predetermined register is enabled for preventing the further advancment of said steering circuit until the control circuit receives two successive pulses from said first pulse source without any intervening pulses from said second pulse source.

22. The combination set forth in claim 21 having means responsive to the enabling of said predetermined register for allowing each pulse from said first pulse source to advance said steering circuit whereby successive ones of said register circuits are enabled.

23. In a toll ticketing telephone system, a source of pulses, a pulse-operated steering readout circuit having a plurality of stages including first and second predetermined stages, first and second marking conductors, a marking potential, means for selectively applying said marking potential to said marking conductors, means responsive to the receipt of successive pulses from said source of pulses for advancing the steering readout circuit one stage per pulse up to the stage immediately preceding said first predetermined stage when said marking potential is singly applied to said first marking conductor, means responsive to the pulse succeeding the pulse which advanced said steering circuit to the stage preceding said first predetermined stage for advancing the steering readout circuit to the stage after the first predetermined stage when said marking potential is singly applied to said first marking conductor, means responsive to the receipt of successive pulses from said source of pulses for advancing the steering readout circuit one stage per pulse up to the stage immediately preceding said second predetermined stage when said marking potential is singly applied to said second marking conductor, and means responsive to the pulse succeeding the pulse which advanced said steering circuit to the stage preceding said second predetermined stage for advancing the steering readout circuit to the stage after the second predetermined stage when said marking potential is singly applied to said second marking conductor.

24. In an automatic toll ticketing telephone system, an electronic digital translator comprising a plurality of registers, each adapted to store a digit, first and second codes each having distinctive distinguishing characteristics, digit sending means operable to supply digits representing said codes for storage in said registers, steering means comprising a series of sequentially fired electronic devices, means coupling each of said registers to one of said devices in said steering means so that the sequential firing of said devices sequentially renders said registers effective for receiving and storing the digits from said sending means, a first condition wherein said first and second codes are registered in said registers in the named sequence, a second condition wherein said first code is not registered and said second code is registered, means responsive to the registration of sufficient digits for determining whether a first or second condition prevails whereby it is determined which registers have registered therein the second code, output means coupled to said registers for providing a single output signal indicative of said second code, matrix means coupled to said output means and controlled by the values of the digits stored in the registers having a second code registered therein, and means including at least one of said electronic devices in said steering means for supplying an operating signal to said matrix means.

25. In an automatic toll ticketing telephone system, an electronic digital translator comprising a plurality of registers each adapted to store a digit, first and second codes each having distinctive distinguishing characteristics, digit sending means operable to supply digits representing said codes for storage in said registers, steering means comprising a series of sequentially fired electronic devices, means coupling each of said registers to one of said devices in said steering means so that the sequential firing of said devices sequentially renders said registers effective for receiving and storing the digits from said sending means, a first condition wherein said first and second codes are registered in said registers in the named sequence, a second condition wherein said first code is not registered and said second code is registered, means responsive to the registration of sufficient digits for determining whether a first or second condition prevails whereby it is determined which registers have registered therein the second code, first matrix means controlled by a first group of said registers for preparing a first control path in accordance with the values of the digits stored in said first group of registers and second matrix means controlled by a second group of said registers for preparing a second control path in accordance with the values of the digits stored in said second group of registers when said first condition prevails, third matrix means controlled by the first group of said registers for preparing a third control path in accordance with the values of the digits stored in said first group of registers when said second condition prevails, first output means coupled to and controlled by said first and second matrix means for providing a single output signal indicative of the digits stored in said first and second groups of said registers, signaling means controlled by said steering means for applying signals to said first and second control paths to operate said first output means when said first condition prevails, second output means coupled to and controlled by said third matrix means for providing a single output signal indicative of the digits stored in said first group of said registers, and signaling means controlled by said steering means for applying signals to said third control path to operate said second output means when said second condition prevails.

26. In a telephone system in which calls are extended to various call terminating areas and offices, first and second types of calls which respectively will and will not include terminating area codes, first register means for storing digits representative of a call terminating area code and a call terminating office code for said first type of call and for storing digits representative of a call terminating office code for said second type of call, a plurality of second registers each adapted to store one of the digits stored in said first register means, first and second groups of said second registers digit entering means controlled by said first register means for transferring the digits stored therein to said second registers and for entering said digits in sequence in said second regsters, flip flop means controlled by said first group of second registers and operated by said digit entering means after the entry of the digits into said first group of second registers for providing a first signal when said first group of second registers have registered therein a terminating area code and for providing a second signal when said first group of second registers have registered therein a terminating office code, first matrix means connected to said first group of second registers and controlled by said first signal and a signal from said digit entering means, second and third matrix means connected respectively to said first and second groups of second registers and controlled by said second signal and a signal from said digit entering means, means for selectively operating said second matrix means to render said second matrix means effective to transmit a translating signal therethrough responsive to the conjoint application of said second signal and a signal from said digit entering means, and means for selectively operating said first and third matrix means to render each of said first and third matrix means effective to transmit individual translating signals therethrough responsive to the conjoint application of said first signal and signals from said digit entering means.

27. In a telephone system, an electronic rate translator for use with a computer requiring rate information of one or more rate items, first, second, and third groups of registers, first, second, and third control pulses, first and second types of calls which respectively will and will not include area codes, means responsive to the initiation of a call of said first type for registering in said first, second, and third groups of registers digits representing respectively area code, called office code, and calling office code information, means responsive to the initiation of a call of said second type for registering in said first, second, and third groups of registers digits representing respectively called office code, at least part of the called number, and calling office code, additional registers for recording the time of call, means responsive to a read signal for interrogating a selected one of said additional registers and providing a time rate signal, means responsive to the registration of digits in said first group of registers for providing said first control pulse, interrogating means responsive to the receipt of the first control pulse for interrogating the first group of registers to determine which group of registers has registered therein called office code information, translating means responsive to the receipt of the second control pulse for interrogating the group of registers which has been determined to have registered therein plural digit called office code information and translating said called office code to a first signal on a unique lead representing the particular registered called office code, translating means responsive to the receipt of the third control pulse for interrogating the first group of registers which have registered therein plural digit area code information and translating said area code to a second signal on a unique lead representing the particular registered area code when the registered call is of said first type, means responsive to the receipt of the third control pulse for interrogating the third group of registers which have registered therein calling office information and translating said calling office information to a third signal on a unique lead representing the particular registered calling office code, and additional means responsive to the receipt of the third control pulse for combining said first, second, and third signals with said time rate signal in a manner to provide a single rate signal to the computer.

28. The rate translator set forth in claim 27 in which any combination of the first, second, and third signals and the time rate signal may be combined to provide a single rate signal to the computer.

29. In a toll ticketing telephone system, an electronic rate translator for use with a computer requiring rate information consisting of one or more rate items, first and second groups of registers for storing digits representing rate items, first and second types of telephone calls, means in said first group of registers for storing digits representing the area in which a telephone call is terminated when the call is of said first type and for storing digits representing the office in which a telephone call is terminated when the call is of said second type, means in said second group of registers for storing digits representing the office in which a telephone call is terminated when the call is of said first type and for storing digits representing at least part of the designations of the called number for said second type of call, means responsive to the registration of digits in said first group of registers for determining to which type of call the registered call belongs, first, second, and third matrices adapted to translate a plural signal input to a single output, means responsive to the registered call being of said first type for connecting said first group of registers to said first matrix and for connecting said second group of registers to said third matrix, means responsive to the call being of said second type for connecting said first group of registers to said second matrix, means for providing a control pulse responsive to the registration of all of said rate items, and means responsive to the receipt of said control pulse for providing a single rate signal to a computer in accordance with the value of the output signals from said matrices.

30. In an automatic toll ticketing telephone system, an electronic rate translator for use with a computer requiring rate information consisting of one or more rate items, first, second, and third groups of registers, other registers, first, second, and third control pulses, first and second types of telephone calls, means responsive to a call of the first type being registered in said groups of registers for said first, second, and third groups of registers to register respectively digits representing the area code, called office code, and calling office code, means responsive to a call of the second type being registered in said registers for said first, second, and third groups of registers to register respectively digits representing the called office code, at least part of the called number, and the calling office code, means responsive to the registration of digits in said first group of registers for providing said first control pulse, means responsive to the registration of digits in said third group of registers for providing said second control pulse, means responsive to the registration of all of said rate items in the other registers for providing said third control pulse, means responsive to the receipt of said first control pulse for determining which group of registers has registered therein the called office code digits, first translating means responsive to the receipt of the second control pulse for translating said plural digit called office code to a first single signal on a unique lead, second translating means responsive to the receipt of said third control pulse for translating the plural digit area code to a second single signal on another unique lead and for combining said first and second signals in a manner to provide a single rate signal to a computer when a call of the first type was registered, and combining means responsive to the receipt of said third control pulse for combining said first signal with the information registered in said third group of registers in a manner to provide a single rate signal to a computer when a call of the second type was registered.

31. The rate translator set forth in claim 30 in which the first translating means comprises a first matrix including a plurality of coordinately arranged conduction devices, each having a control electrode adapted to receive a control signal from the group of registers having registered therein the plural digit called office code.

32. The rate translator set forth in claim 30 in which the second translating means comprises a second matrix including a plurality of coordinately arranged conduction devices, each having a control electrode adapted to receive a control signal from the group of registers having registered therein the plural digit area code, and in which the means for combining said first and second signals comprises a third matrix including a plurality of coordinately arranged conduction devices, each having an electrode adapted to receive a control signal from the output of said first and second matrices.

33. The rate translator set forth in claim 30 in which said combining means comprises a third matrix including a plurality of coordinately arranged conduction devices, each having a control electrode adapted to receive a signal, means for connecting said first signal to one of said conduction devices, means for connecting the output signal of said third group of registers to other of said conduction devices, and means responsive to the conjoint application of said signals to said third matrix for producing a single rate signal.

References Cited in the file of this patent

UNITED STATES PATENTS

| | | |
|---|---|---|
| 2,603,715 | Vaughan | July 15, 1952 |
| 2,631,195 | Ostline | Mar. 10, 1953 |
| 2,749,387 | Barlow | June 5, 1956 |
| 2,834,835 | Shepherd | May 13, 1958 |
| 2,886,642 | Morris | May 12, 1959 |
| 2,955,163 | Ostline et al. | Oct. 4, 1960 |
| 2,965,718 | Avery | Dec. 20, 1960 |